US012643224B2

(12) United States Patent
Saintyves et al.

(10) Patent No.: US 12,643,224 B2
(45) Date of Patent: Jun. 2, 2026

(54) SELF-ASSEMBLING SHAPE-MORPHING ROBOTIC PLATFORM

(71) Applicants: The University of Chicago, Chicago, IL (US); Illinois Institute of Technology, Chicago, IL (US)

(72) Inventors: Baudouin Saintyves, Chicago, IL (US); Heinrich M. Jaeger, Chicago, IL (US); Matthew J. Spenko, Chicago, IL (US)

(73) Assignee: The University of Chicago, Chicago, IL (US)

( * ) Notice: Subject to any disclaimer, the term of this patent is extended or adjusted under 35 U.S.C. 154(b) by 319 days.

(21) Appl. No.: 18/392,132

(22) Filed: Dec. 21, 2023

(65) Prior Publication Data

US 2024/0208044 A1     Jun. 27, 2024

Related U.S. Application Data

(60) Provisional application No. 63/434,167, filed on Dec. 21, 2022.

(51) Int. Cl.
*B25J 9/08* (2006.01)
*A63H 33/04* (2006.01)
(Continued)

(52) U.S. Cl.
CPC .............. *B25J 9/08* (2013.01); *A63H 33/046* (2013.01); *B25J 9/065* (2013.01); *B25J 9/126* (2013.01)

(58) Field of Classification Search
CPC . A63H 33/046; B25J 9/065; B25J 9/08; B25J 9/126
See application file for complete search history.

(56) References Cited

U.S. PATENT DOCUMENTS

2021/0205983 A1*   7/2021   Lam ........................... B25J 9/08

FOREIGN PATENT DOCUMENTS

| CN | 107322635 A | * | 11/2017 | .......... B25J 17/0266 |
| CN | 107363819 A | * | 11/2017 | .............. B25J 9/065 |
| JP | 2003048179 A | * | 2/2003 | |

OTHER PUBLICATIONS

Romanishin, John W., Kyle Gilpin, and Daniela Rus. "M-blocks: Momentum-driven, magnetic modular robots." *2013 IEEE/RSJ International Conference on Intelligent Robots and Systems.* IEEE, 2013; pp. 1-9.

(Continued)

*Primary Examiner* — Khoi H Tran
*Assistant Examiner* — Dale Moyer
(74) *Attorney, Agent, or Firm* — Bell & Manning, LLC

(57) ABSTRACT

A robotic system includes a first robotic unit, where the first robotic unit includes a wheel and an actuator that is mounted to the wheel. The actuator is configured to rotate an active rotor that is mounted within the wheel. The first robotic unit also includes an actuated magnet that is mounted to the active rotor such that the actuator controls rotation of the actuated magnet within the wheel. The first robotic unit also includes a free magnet mounted to a passive rotor that rotates within the wheel. Movement of the actuated magnet by the actuator causes rotation of the wheel, and wherein the free magnet is configured to attach to a second actuated magnet of a second robotic unit to facilitate movement of the first robotic unit, and allow for continuous, material-like, deformation in a multi-units aggregate.

20 Claims, 20 Drawing Sheets

(51) Int. Cl.
  *B25J 9/06* (2006.01)
  *B25J 9/12* (2006.01)

(56) References Cited

OTHER PUBLICATIONS

Romanishin, John W., et al. "3D M-Blocks: Self-reconfiguring robots capable of locomotion via pivoting in three dimensions." *2015 IEEE International Conference on Robotics and Automation (ICRA)*. IEEE, May 26-30, 2015; pp. 1-8.
Liang, Guanqi, et al. "Freebot: A freeform modular self-reconfigurable robot with arbitrary connection point-design and implementation." *2020 IEEE/RSJ International Conference on Intelligent Robots and Systems (IROS)*. IEEE, 2020; pp. 1-8.
J. Paik, B. An, D. Rus, and R. J. Wood. Robotic origamis: self-morphing modular robots, Proc. 2nd Int. Conf. on Morphological Computation, Venice, Italy, Sep. 2011; pp. 1-3.
Shaw, Lucas A., et al. "Compliant rolling-contact architected materials for shape reconfigurability." *Nature communications* 9.1 (2018): 4594; pp. 1-12.
Fang, Xin, et al. "Programmable gear-based mechanical metamaterials." *Nature Materials* 21.8 (2022): 869-876.

* cited by examiner

SELF-ASSEMBLING SHAPE-MORPHING ROBOTIC PLATFORM

CROSS-REFERENCE TO RELATED APPLICATIONS

The present application claims the priority benefit of U.S. Provisional Patent Application No. 63/434,167 that was filed Dec. 21, 2022, the entire contents of which are incorporated by reference herein.

REFERENCE TO GOVERNMENT RIGHTS

This invention was made with government support under NSF1830939 awarded by the National Science Foundation. The government has certain rights in the invention.

BACKGROUND

Robots generally refer to machines that can be programmed to automatically carry out a series of operations or tasks. Robots are used in many different areas, including manufacturing, assembly, packing, space exploration, cleaning, as well as search and rescue, and they come in different shapes and sizes, depending on their intended application. Mobile robots are a class of robots that can carry out tasks while also performing locomotion. Reconfigurable robots can change their overall shape to perform different tasks and to move about. Soft robots in addition have significant compliance when contacting objects. Robotics is a growing industry, and new types of robots and robot applications are being rapidly developed in various industries to improve efficiency, decrease cost, increase worker safety, etc.

SUMMARY

An illustrative robotic system includes a first robotic unit, where the first robotic unit includes a wheel and an actuator that is mounted to the wheel. The actuator is configured to rotate an active rotor that is mounted within the wheel. The first robotic unit also includes an actuated magnet that is mounted to the active rotor such that the actuator controls rotation of the actuated magnet within the wheel. The first robotic unit also includes a free magnet mounted to a passive rotor that rotates within the wheel. Movement of the actuated magnet by the actuator causes rotation of the wheel, and wherein the free magnet is configured to attach to a second actuated magnet of a second robotic unit to facilitate movement of the first robotic unit.

In an illustrative embodiment, the first robotic unit also includes a sensor, and the sensor measures an amount of rotation of the actuator. In one embodiment, the first robotic unit also includes a computing system that includes a transceiver, and the transceiver receives information regarding the second robotic unit and a third robotic unit. The information received by the transceiver can be an indication that the third robotic unit is attached to the actuated magnet of the first robotic unit. In another embodiment, the transceiver transmits a motor angle value to the third robotic unit for propagation to a fourth robotic unit such that all robotic units in an assembly receive the motor angle value.

In another embodiment, the first robotic unit also includes a computing system that includes a transceiver, and the transceiver receives a motor angle value of the second robotic unit. In such an embodiment, the computing system includes a processor, and the processor is configured to determine an amount of rotation of the motor to achieve a desired movement, where the amount of rotation of the motor is determined based on the motor angle value received from the second robotic unit.

In another embodiment, the first robotic unit also includes a computing system that includes a processor, and the first robotic unit is temporarily a leader unit. The processor uses a timer to control a duration during which the motor of the leader unit rotates. Upon expiration of the timer, the processor sends a message to the second robotic unit that indicates the second robotic unit is temporarily the leader unit for a subsequent movement. In another embodiment, the actuator comprises a motor, and a polarity of voltage applied to the motor controls a direction of rotation of the motor. In another embodiment, adjacent robotic units are assigned opposite voltage polarities such that the adjacent robotic units rotate in opposite directions.

In another embodiment, the first robotic unit is part of a sequence of robotic units that also includes the second robotic unit, and wherein each robotic unit in the sequence is provided with its relative position in the sequence. In another embodiment, the first robotic unit is assigned a compliance state, and the compliance state indicates whether an assembly that includes the first robotic unit is rigid or soft.

An illustrative method of forming a robotic unit includes forming a wheel and mounting an actuator to the wheel. The method also includes mounting an active rotor to the actuator, where the actuator is configured to rotate the active rotor. The method also includes mounting an actuated magnet to the active rotor such that the actuator controls rotation of the actuated magnet within the wheel to cause rotation of the wheel. The method further includes mounting a free magnet to a passive rotor that rotates within the wheel, where the free magnet is configured to attach to a second actuated magnet of a second robotic unit to facilitate movement of the first robotic unit, and allow for continuous, material-like, deformation in a multi-units aggregate.

In some embodiments, the method includes mounting a sensor to the actuator, where the sensor measures an amount of rotation of the motor. Another embodiment includes mounting a printed circuit board that houses a computing system within the wheel, where the computing system includes a processor configured to control a polarity of a voltage applied to the actuator, wherein the polarity of the voltage controls a direction of rotation of the actuator. In one embodiment, the computing system also includes a transceiver configured to receive an instruction regarding which polarity of the voltage to apply to the motor. Adjacent robotic units use voltages of opposite polarity such that the adjacent robotic units rotate in opposite directions.

The method can also include mounting a printed circuit board that houses a computing system within the wheel, where the computing system includes a processor configured to receive an indication that the robotic unit is a leader unit. In such an embodiment, the processor uses a timer to control a duration during which the motor of the leader unit rotates. Upon expiration of the timer, the processor sends a message to the second robotic unit that indicates the second robotic unit is the leader unit for a subsequent movement.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

as a function of |u|, where $$S_i^{max}$$

is the maximum of the single-sided amplitude spectrum determined by applying FFT to $\theta(t)$ in accordance with an illustrative embodiment.

Figures 6A, 6B, 6C:
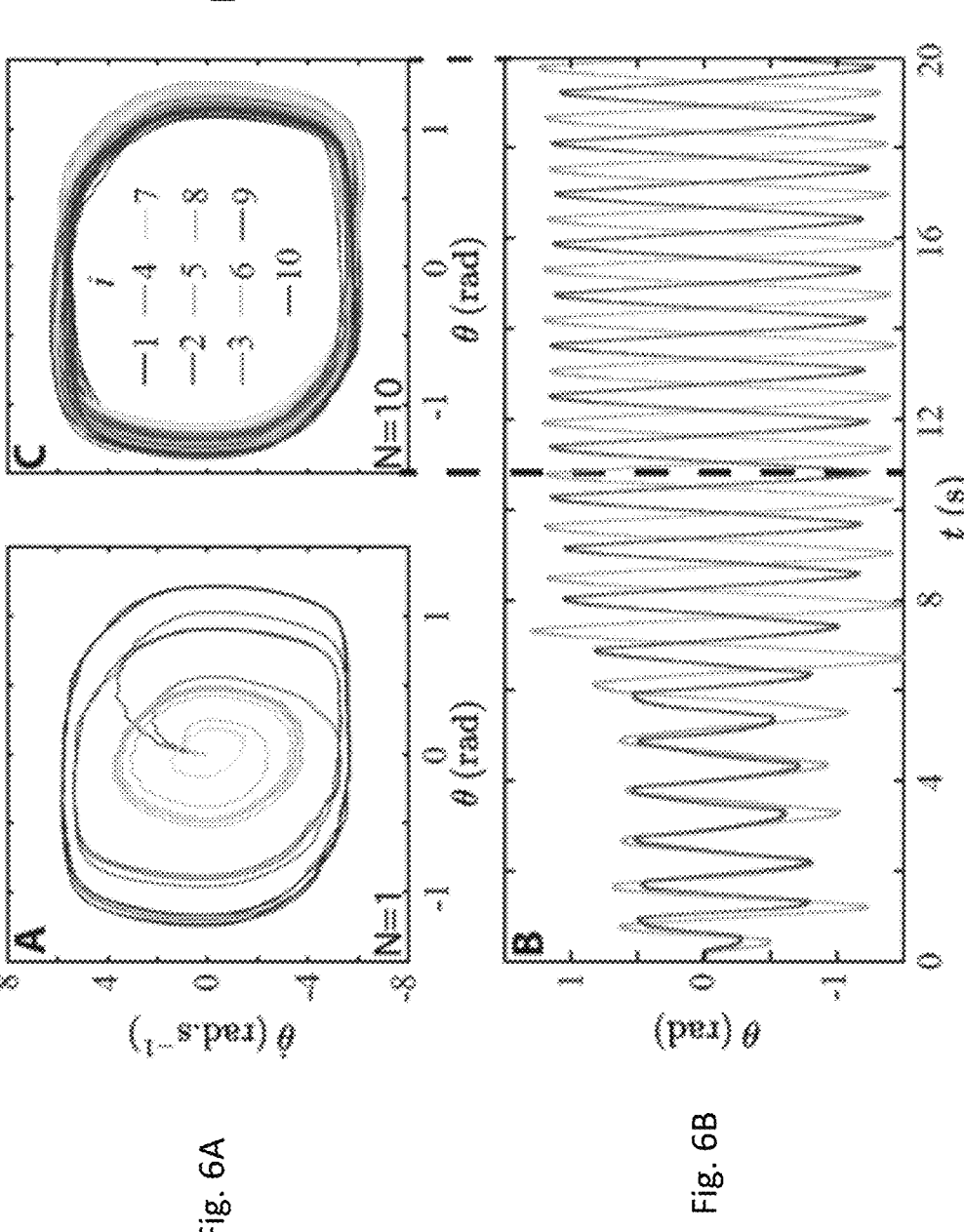
FIG. 6A shows phase space ($\theta$, $\dot{\theta}$) of a single isolated unit for different |u| and $\alpha$ in accordance with an illustrative embodiment.
FIG. 6B shows angle as a function of time for two coupled neighboring units in the chain aggregate, after turning all units on at t=0 in accordance with an illustrative embodiment.
FIG. 6C depicts limit cycles followed by all coupled units in the steady regime of the experiments corresponding to FIG. 6B in accordance with an illustrative embodiment.
Figures 6D, 6E, 6F:
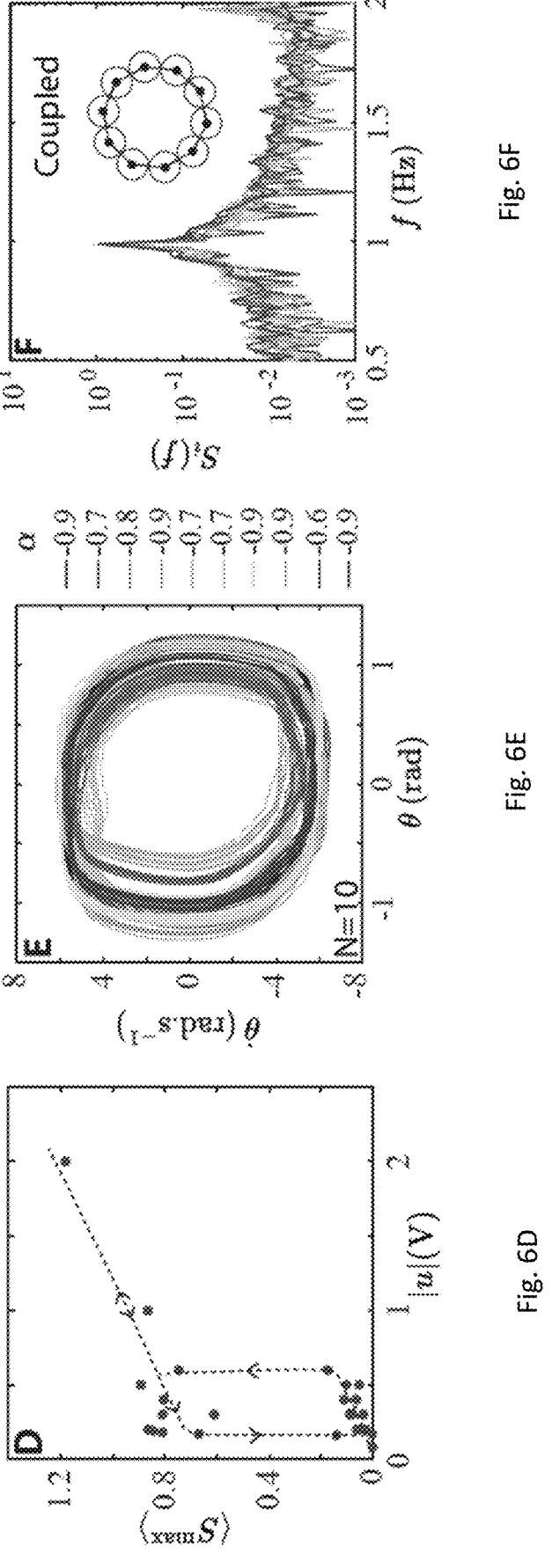
FIG. 6D shows maximum of power spectrum averaged over $$N = 10 \text{ units } \langle S^{max} \rangle = \frac{1}{N} \sum S_i^{max}$$

FIG. 6E shows limit cycles observed in an aggregate with $\alpha \in [-0.9, -0.6]$, |u|=1.0 V in accordance with an illustrative embodiment.

FIG. 6F shows a power spectrum observed for each of the units when coupled into a ring aggregate in accordance with an illustrative embodiment.

Figure 6H:
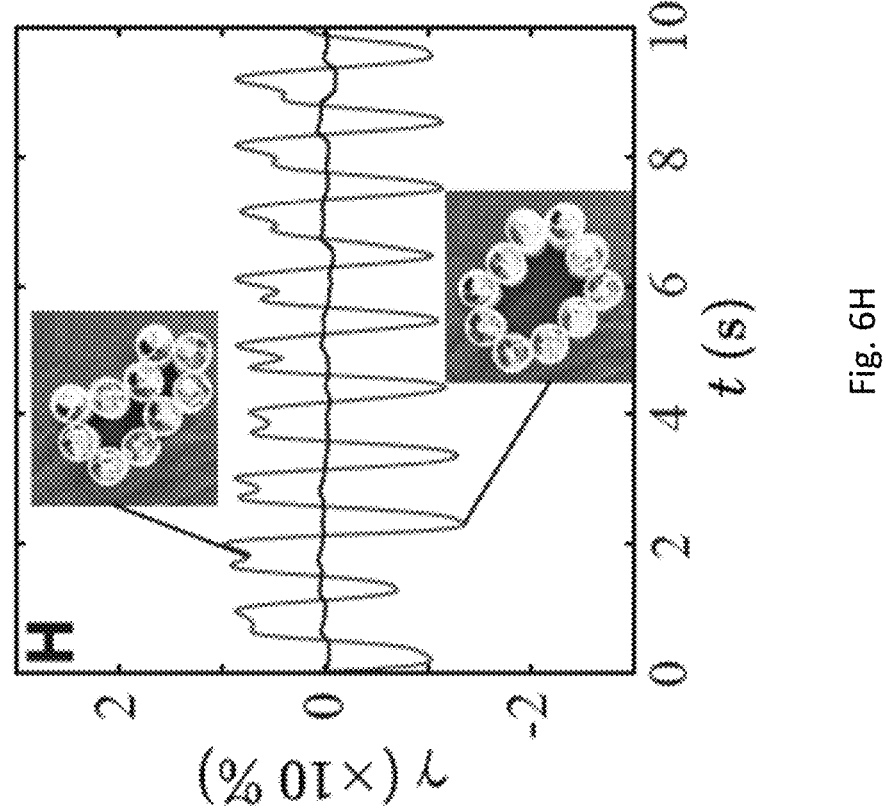
Figure 6G:
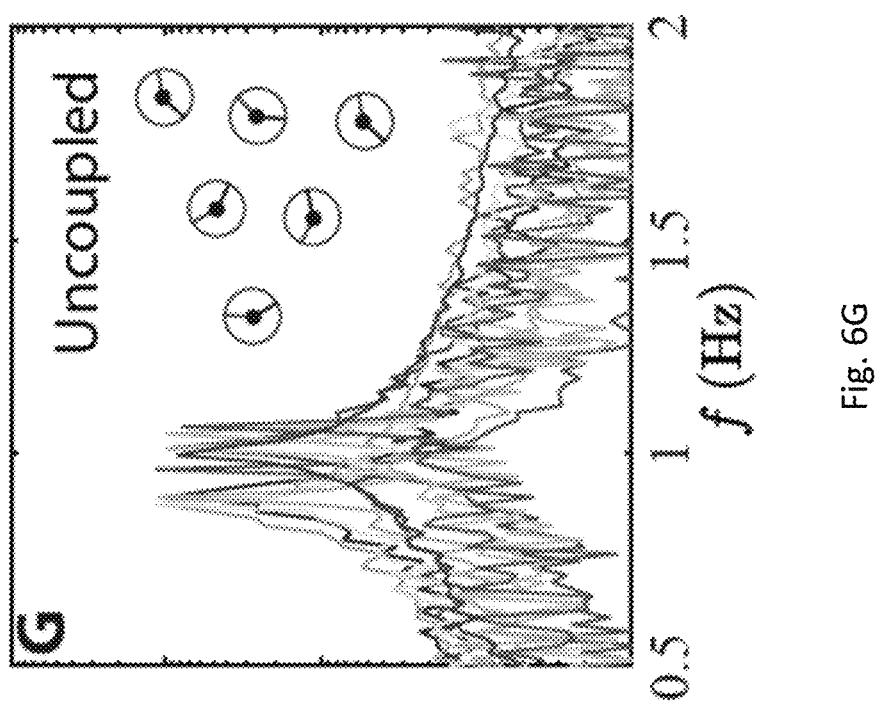

FIG. 6G shows a power spectrum observed for each of the units when isolated in accordance with an illustrative embodiment.

FIG. 6H shows shape deformation $\gamma = (A - A(t=0))/A(t=0)$ over time, with A the area covered by the assembly, for an aggregate with $\alpha_i = \alpha$ and with a range of $\alpha$ in accordance with an illustrative embodiment.

Figures 7A, 7B, 7C, 7D:
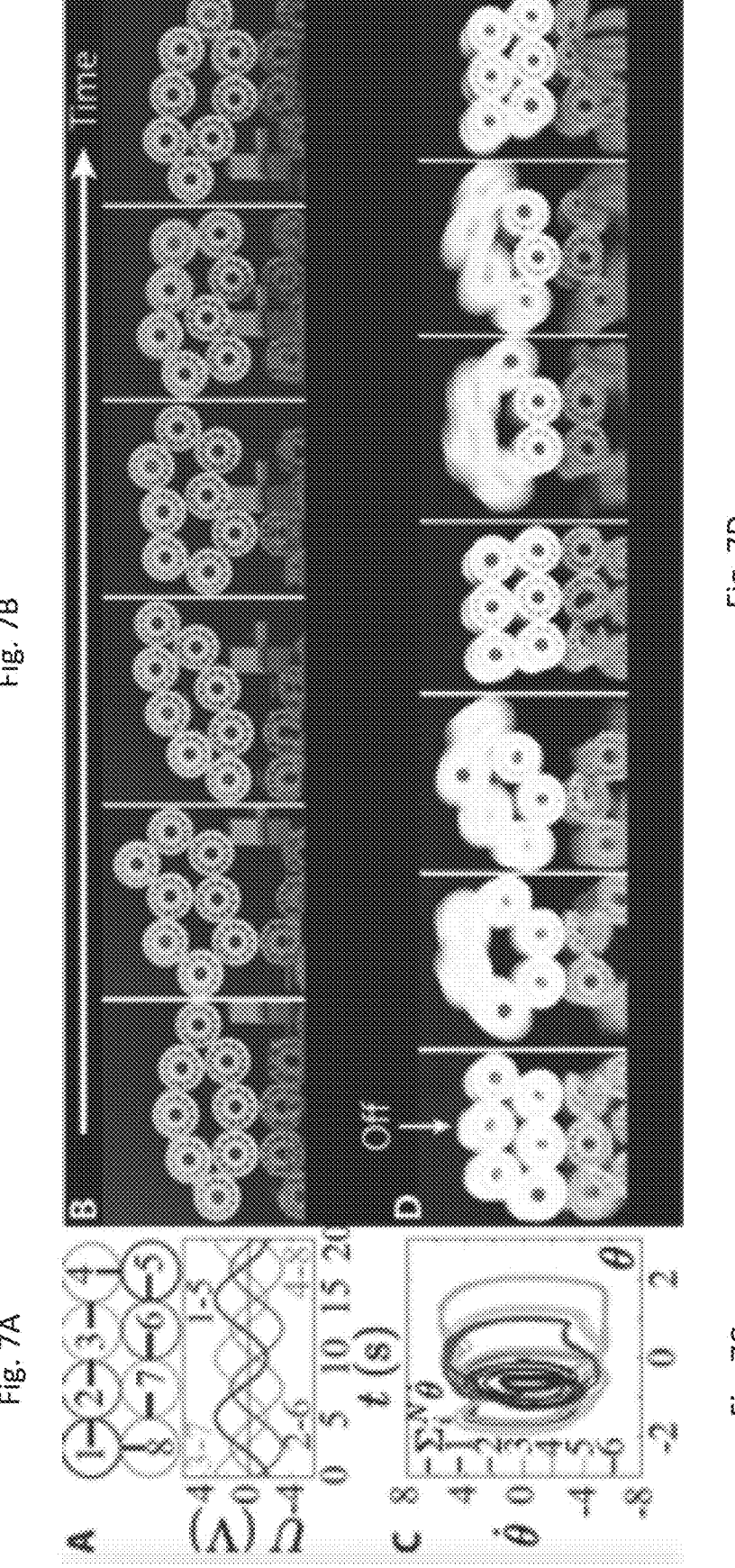

FIG. 7A shows a liquid-like gait using a set of voltage biases with shifted phases in an aggregate of N=8 units ($u_0$=0.7 V and A=2.4 V) in accordance with an illustrative embodiment.

FIG. 7B depicts snapshots of a Granulobot aggregate using the gait (FIG. 7A) to move over an obstacle in accordance with an illustrative embodiment.

FIG. 7C shows a limit cycle reached by a closed chain aggregate in the self-oscillating solid state with N=6 units, after turning unit i=1 off (|u|=2 V, $\alpha$=−0.9 and G=1.0 Nm/rad) in accordance with an illustrative embodiment.

FIG. 7D depicts snapshots of a steadily moving self-organized aggregate corresponding to the gait in FIG. 7C in accordance with an illustrative embodiment.

Figures 7E, 7F, 7G, 7H:
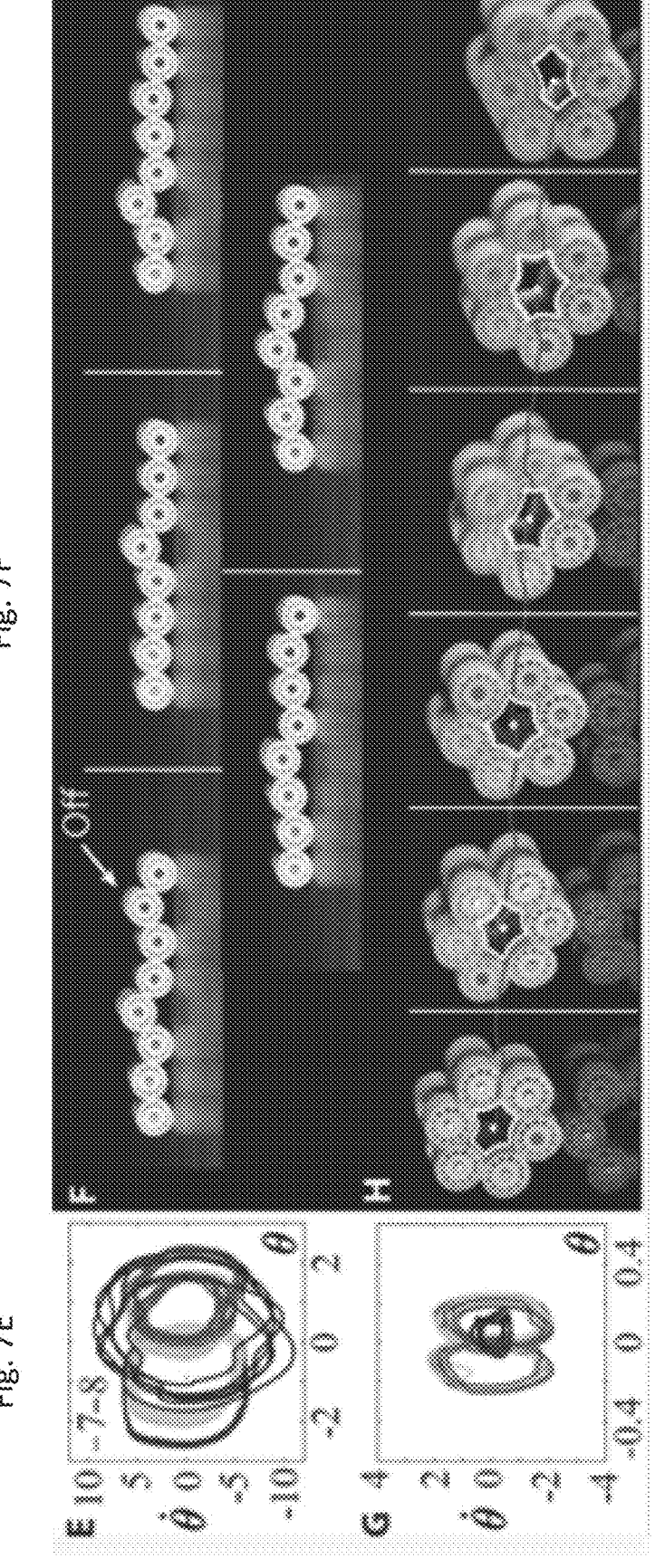

FIG. 7E depicts a limit cycle of an open chain aggregate in the self-oscillating solid state with N=8 units, after turning unit i=7 off (|u|=1 V, $\alpha$=−0.9 and G=0.5 Nm/rad) in accordance with an illustrative embodiment.

FIG. 7F shows snapshots of a steadily moving self-organized aggregate corresponding to the gait in FIG. 7E in accordance with an illustrative embodiment.

FIG. 7G depicts a limit cycle from a leader-follower scheme to implement a propagating perturbation (inertial shape-shifter) in accordance with an illustrative embodiment.

FIG. 7H shows snapshots corresponding to the gait of FIG. 7G in accordance with an illustrative embodiment.

Figures 8A, 8B:
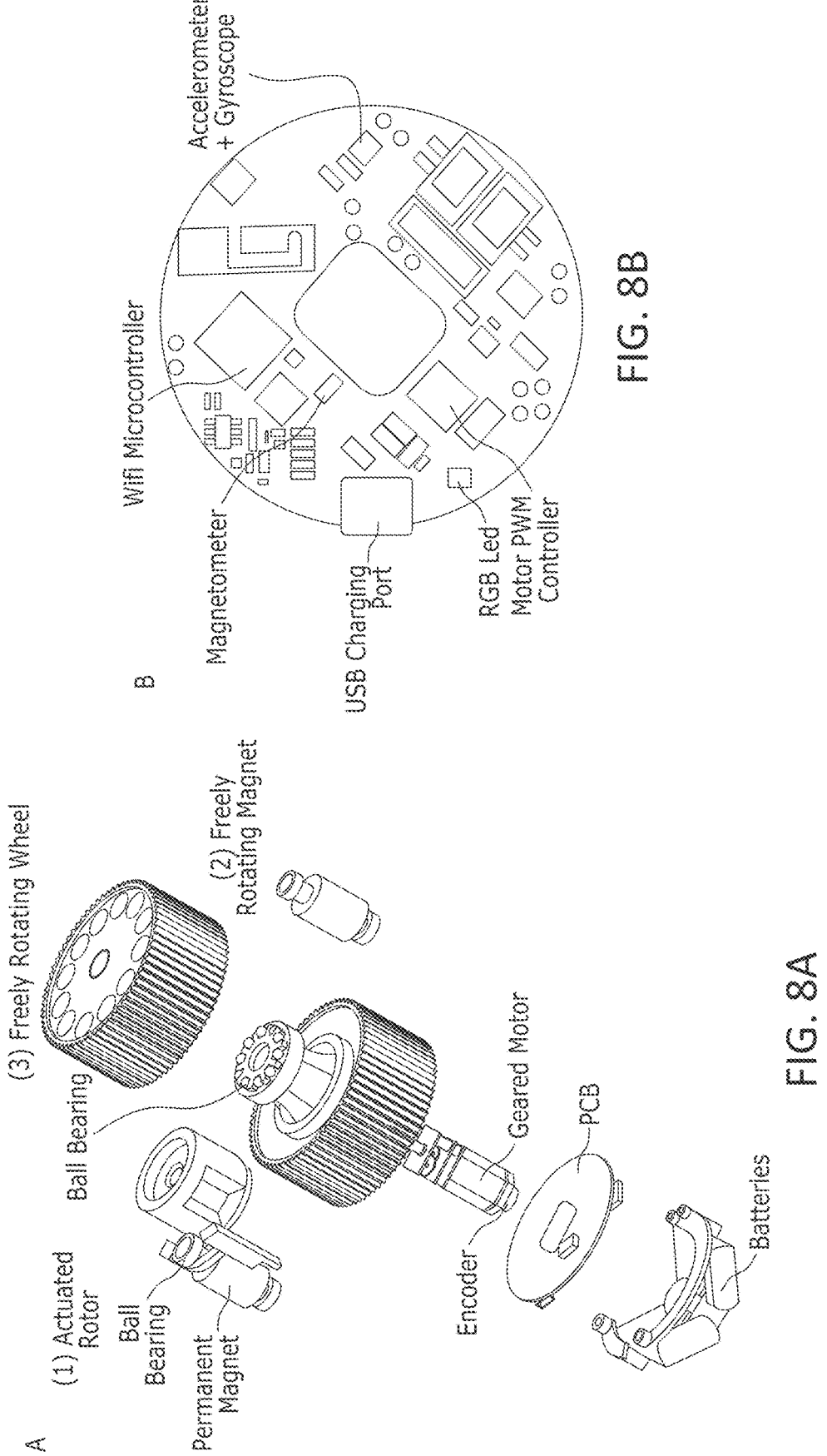

FIG. 8A is an exploded view of Granulobot 3D model in accordance with an illustrative embodiment.

FIG. 8B shows assembled electronic circuitry, custom-designed for driving and real-time measurements in accordance with an illustrative embodiment.

Figure 8D:
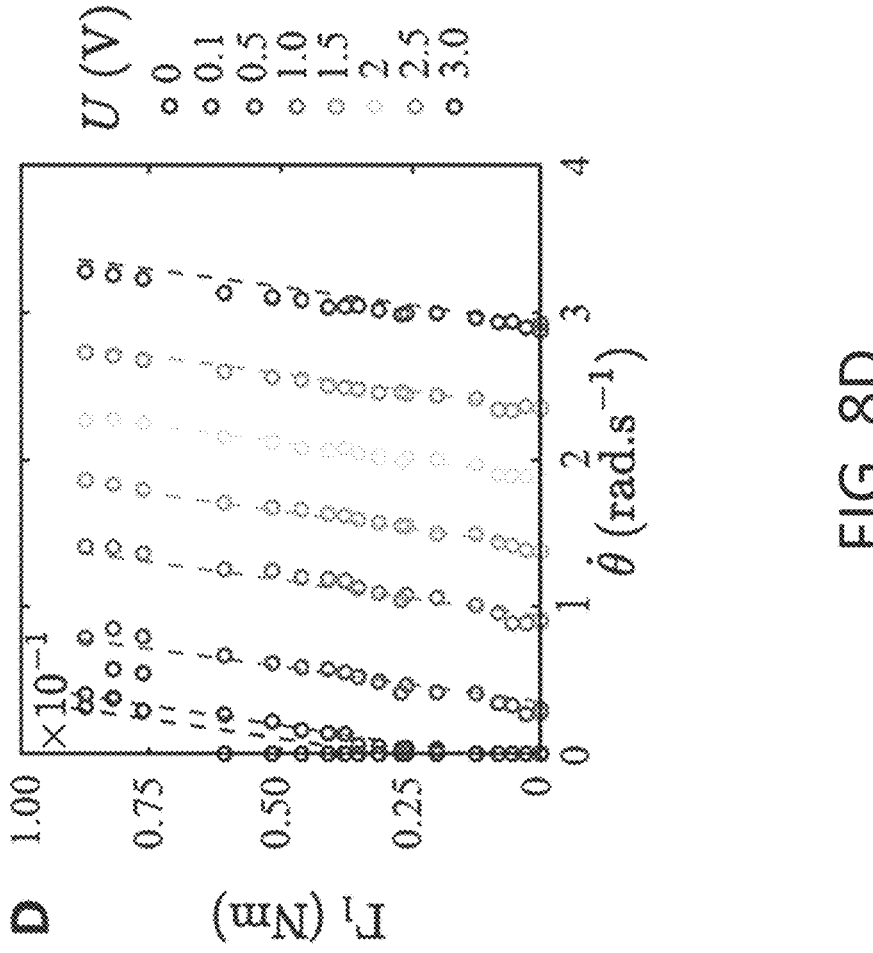
Figure 8C:
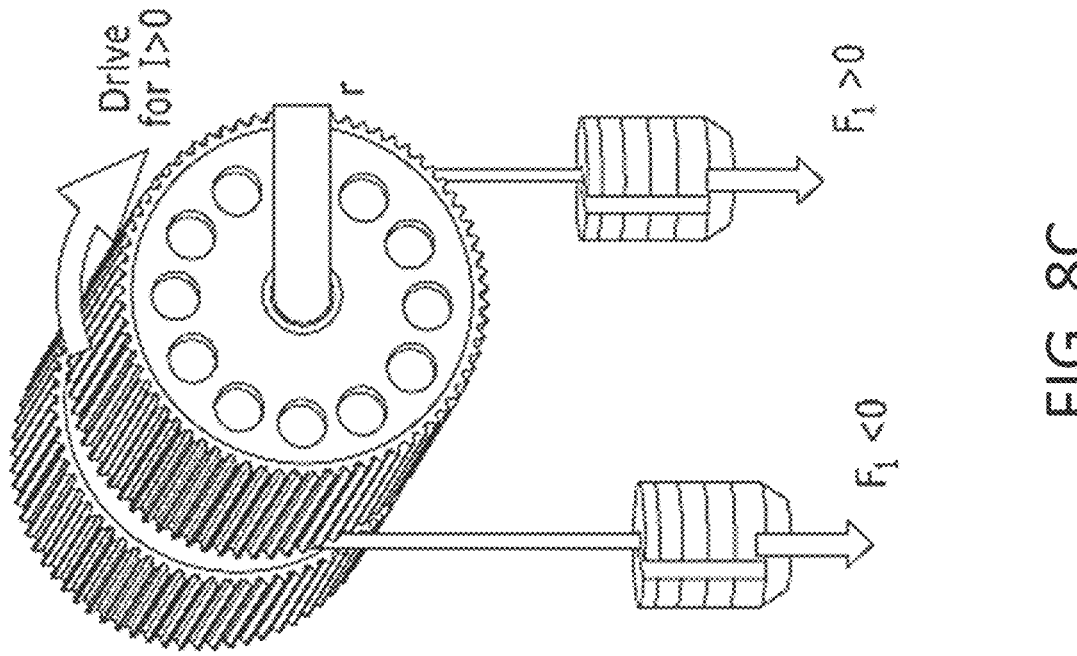

FIG. 8C is a sketch to indicate sign convention in accordance with an illustrative embodiment.

FIG. 8D depicts torque load as a function of rotation speed for different voltages in accordance with an illustrative embodiment.

Figures 8E, 8F, 8G:
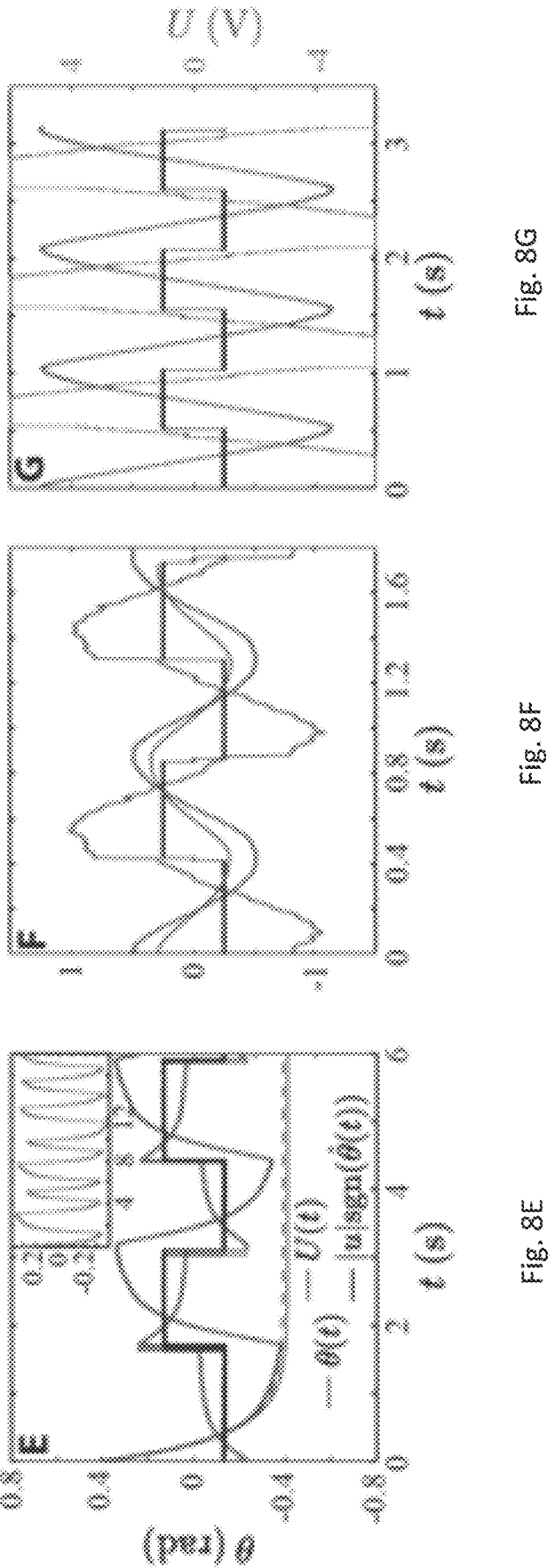

FIG. 8E shows overdamped self-oscillation ($\zeta$>1) in which $\alpha$=0, |u|=1 V, and G=0.5 Nm/rad, corresponding to $\zeta$=1.37 and $\omega_0$=5.88 rads$^{-1}$ in accordance with an illustrative embodiment.

FIG. 8F shows self-oscillation in the crossover regime (0<$\zeta$<1). $\alpha$=−0.5, |u|=1 V, G=1 Nm/rad, corresponding to $\zeta$=0.48 and $\omega_0$=8.31 rads$^{-1}$ in accordance with an illustrative embodiment.

FIG. 8G shows underdamped self-oscillations ($\zeta$=0). $\alpha$=−1, |u|=1 V, and G=1 Nm/rad, corresponding to $\omega_0$=8.31 rads$^{-1}$ in accordance with an illustrative embodiment.

Figure 9:
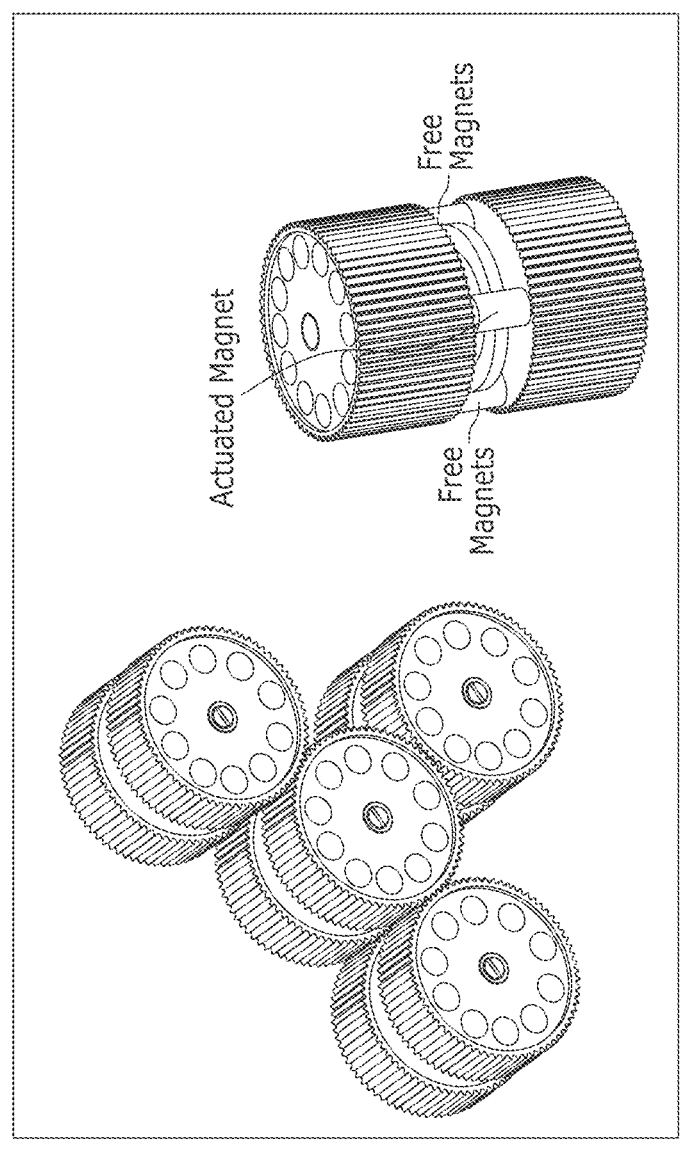

FIG. 9 depicts Granulobots with three-fold coordination in accordance with an illustrative embodiment.

Figures 10A, 10B, 10C, 10D:

FIG. 10A depicts a power spectrum $S_i(f)$ for each of the units when coupled into a ring aggregate with $\alpha=-0.9$ in accordance with an illustrative embodiment.

FIG. 10B depicts a phase shift $\Delta\phi_i=\phi_i-\phi_{i-1}$ between consecutive units when they are all coupled into a ring aggregate with $\alpha=-0.9$ in accordance with an illustrative embodiment.

FIG. 10C depicts a power spectrum $S_i(f)$ for each of the units when coupled into a ring aggregate with a spread of $\alpha\in[-0.6,-0.9]$ in accordance with an illustrative embodiment.

FIG. 10D depicts phase shift $\Delta\phi_i=\phi_i-\phi_{i-1}$ between consecutive units when they are all coupled into a ring aggregate with a spread of $\alpha\in[-0.6,-0.9]$ in accordance with an illustrative embodiment.

Figure 10E:
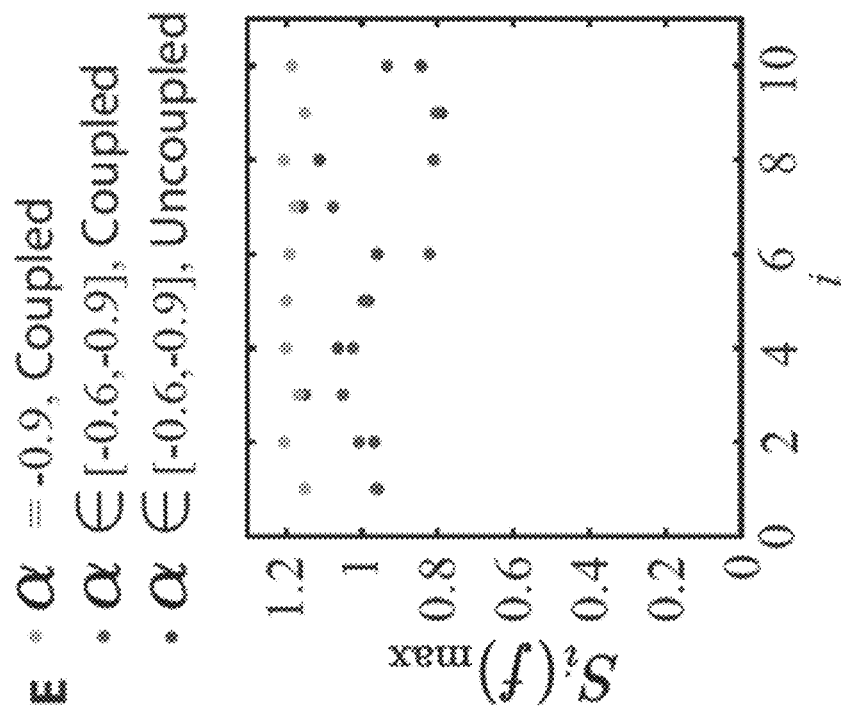

FIG. 10E depicts comparison of oscillation amplitude of each unit when coupled in a ring with $\alpha=-0.9$, when coupled in a ring with a spread of $\alpha\in[-0.6,-0.9]$, when isolated with a spread of $\alpha\in[-0.6,-0.9]$ in accordance with an illustrative embodiment.

Figures 11A, 11B, 11C:
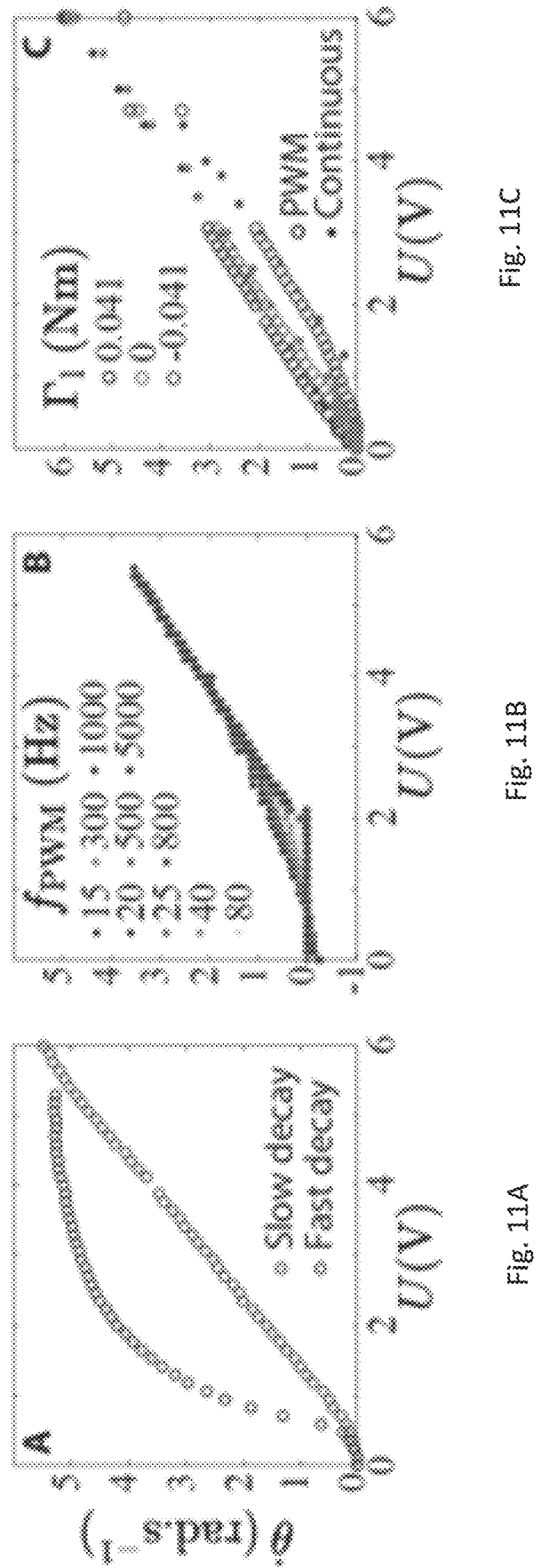

FIG. 11A shows angular speed $\dot\theta$ as a function of applied PWM voltage $U_{PWM}$ for slow and fast decay mode, with $\Gamma_f=0.05$ Nm, and PWM frequency $f_{PWM}=25$ Hz in accordance with an illustrative embodiment.

FIG. 11B shows angular speed $\dot\theta$ as a function of applied PWM voltage $U_{PWM}$ for different PWM frequencies $f_{PWM}$ with $\Gamma_f=0.08$ Nm in accordance with an illustrative embodiment.

FIG. 11C shows angular speed $\dot\theta$ as a function of applied PWM voltage $U_{PWM}$ with $f_{PWM}=25$ Hz (circles), and with a continuous voltage source (dots) for $\Gamma_f=-0.04$, 0 and 0.04 Nm in accordance with an illustrative embodiment.

Figures 12A, 12B:
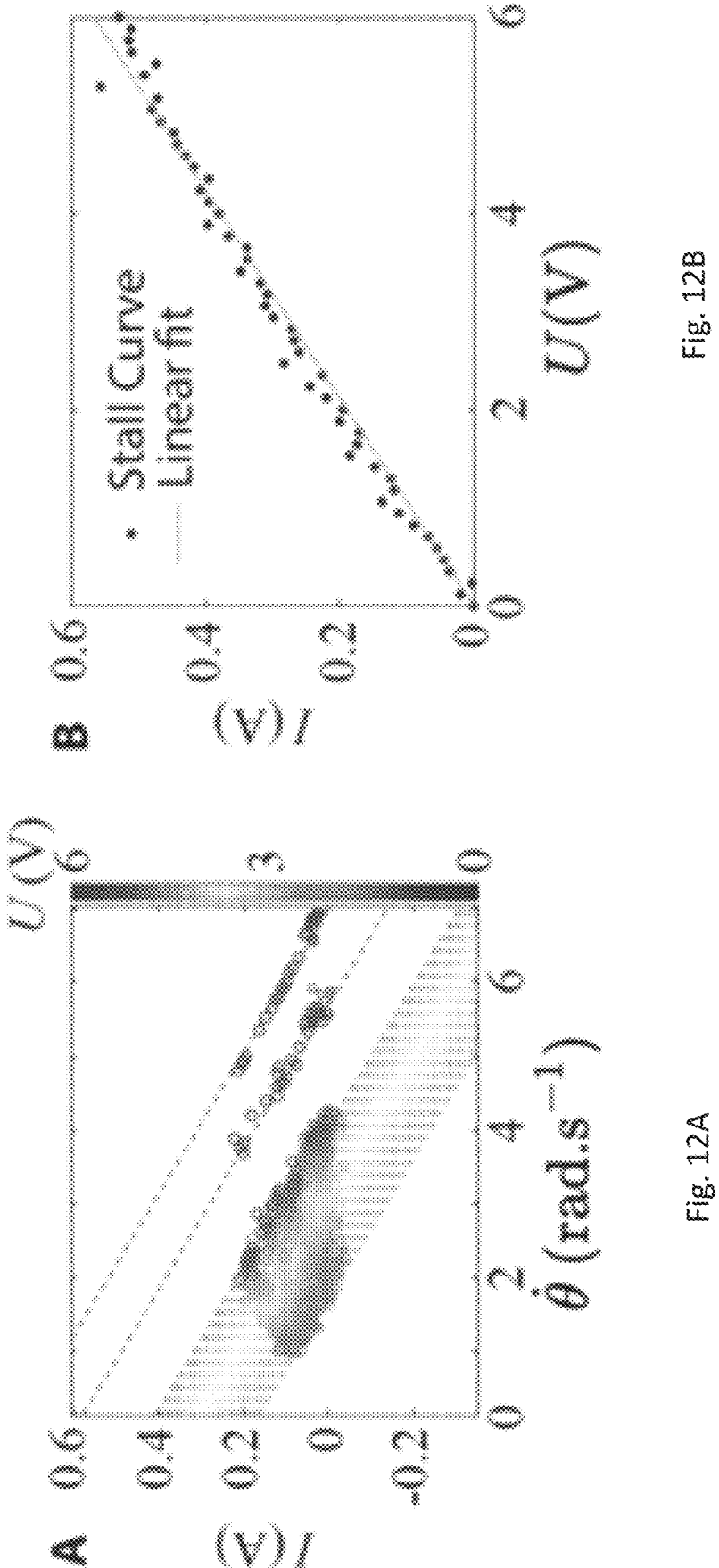

FIG. 12A shows measured current I as function of measured angular velocity for a range of applied PWM voltage $U_{PWM}\in[0, 6]$ and a range of $\Gamma_f\in[-0.08, 0.08]$ Nm (circles and squares correspond to negative and positive loads, respectively) in accordance with an illustrative embodiment.

FIG. 12B shows measured current I as a function of applied PWM voltage $U_{PWM}$ when the rotor is stalled in accordance with an illustrative embodiment.

Figure 13B:
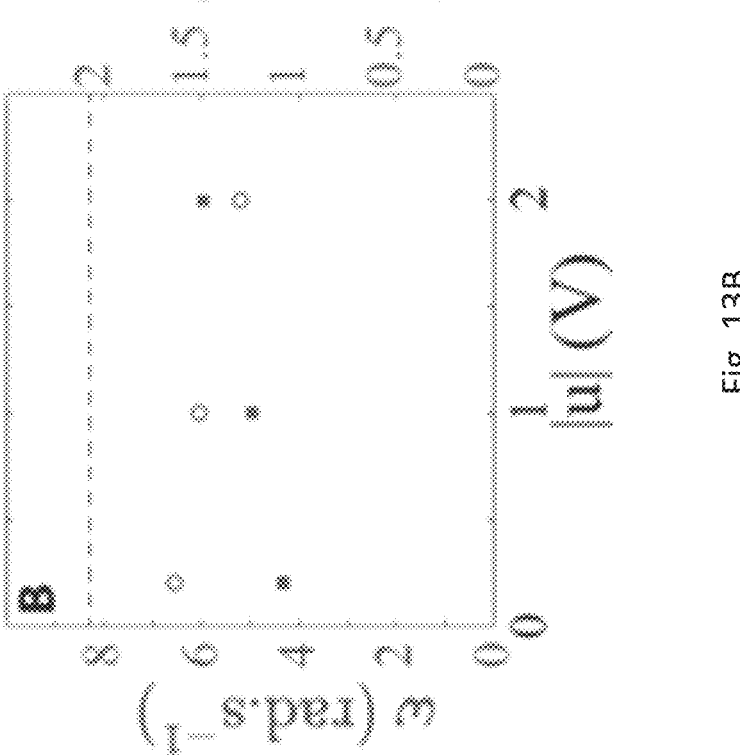
Figure 13A:
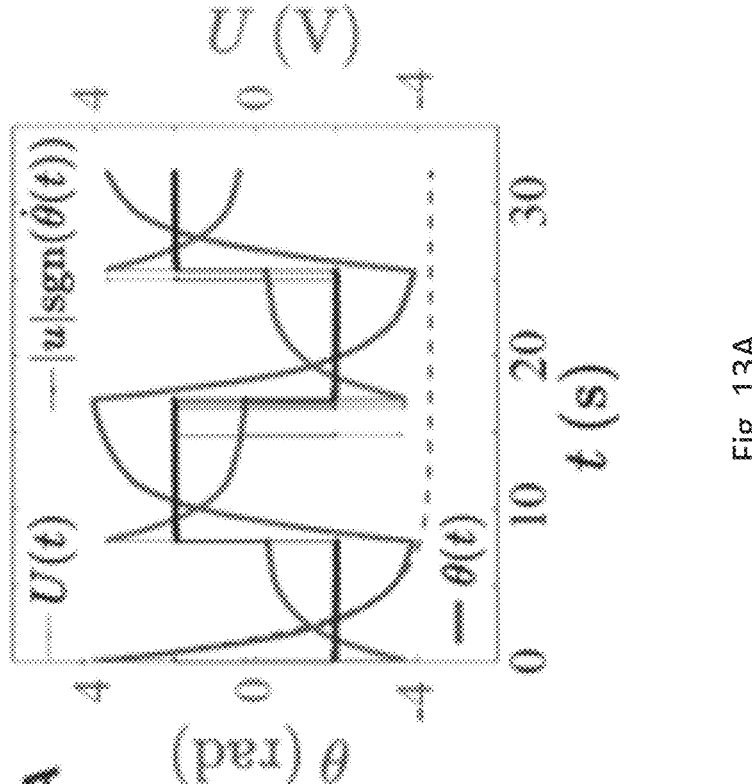

FIG. 13A shows 0, voltage bias u, and total voltage U produced by the circuitry measured simultaneously as a function of time for $|u|=2$ V>u*, G=0.1 Nm/rad, and $\alpha=0$ in accordance with an illustrative embodiment.

FIG. 13B shows oscillation frequency $\omega$ (circles) and steady-state amplitude of the oscillations (squares) as a function of the bias $|u|$ for $\alpha=0$ and $\Gamma_f=0$ in accordance with an illustrative embodiment.

Figure 14:
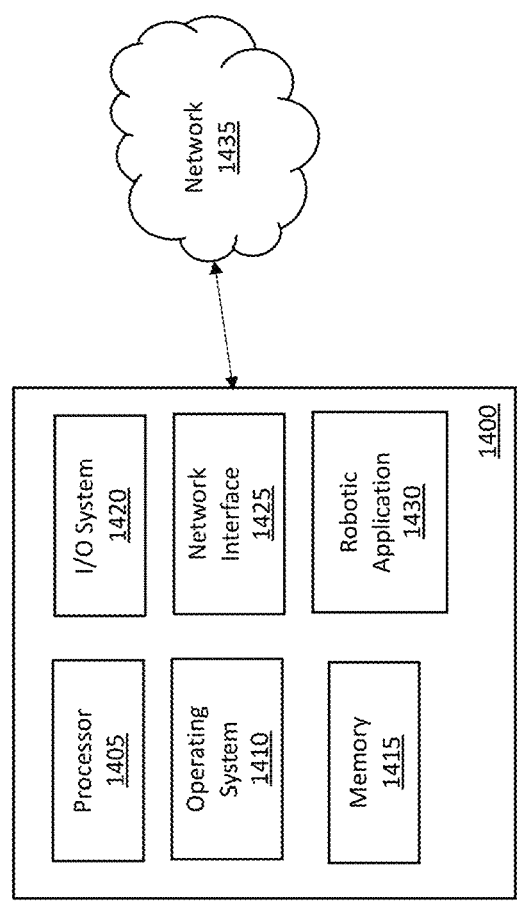

FIG. 14 is a block diagram of a computing system to implement a robotic assembly in accordance with an illustrative embodiment.

DETAILED DESCRIPTION

Described herein are robotic systems that can change their physical form factor as well as their compliance to adapt to environmental constraints. The robotic system (Granulobot) is a modular system that blurs the distinction between soft, modular, and swarm robotics. The system includes gear-like units that each contain at least one actuator such that units can self-assemble into larger, granular aggregates using magnetic coupling. The aggregates can reconfigure dynamically and also split into subsystems that are able to later recombine. Aggregates can also self-organize into collective states with solid- and liquid-like properties, thus displaying widely differing compliance. These states can be perturbed locally via actuators or externally via mechanical feedback from the environment to produce adaptive shape shifting in a decentralized manner. This in turn can generate locomotion strategies adapted to different conditions. Aggregates can move over obstacles without using external sensors. Aggregates can also coordinate to maintain a steady gait over different surfaces without electronic communication among units. The modular design highlights a physical, morphological form of control that advances the development of resilient robotic systems with the ability to morph and adapt to different functions and conditions.

INTRODUCTION

The development of autonomous and efficient agents that can adapt to a variety of environments and perform different functions by reconfiguring their body is one of the frontiers in the field of robotics. There is an increasing need for systems that offer multi-functional, self-assembling, highly compliant capabilities in concert with resilience and robustness. To this end, while traditional robotic design tends to distinguish and separate components dealing with sensing, actuation, computation, and communication, an alternative strategy distributes components that each integrate these functions. For instance, modular design approaches replace a single mechanical body with an aggregate of multi-functional subunits that can assemble and couple together. However, in traditional systems this coupling often leads to rigid connections between docked units, which then implies that changes of the overall aggregate shape require an iterative reconfiguration process whereby units need to disconnect, move, and then reconnect at another location. This is incompatible with a variable mechanical compliance of the overall structure and limits adaptability to changing tasks or environments.

Soft robotics may overcome some of these limitations. However, while robotic systems with a single soft body are able to achieve highly variable and adaptive behaviors, the inherent need to model materials in the large deformation limit makes the design difficult. Furthermore, inspired by flocking observed in nature, multi-agent swarm approaches have been successful in generating autonomous, as well as resilient robotic systems by using a large number of individual robotic units where large-scale collective behaviors emerge through local rules between neighboring units. Such non-centralized control is able to absorb local perturbations in the inherent noise of the collective organization, and the failure of a few in a swarm of similar units does not necessarily affect the capabilities at the collective scale. However, robotic swarms have so far been limited to low density, fluid-like systems with very little overall rigidity of the system as a whole.

The robot system described herein, Granulobots, combines several desirable features of modular, soft, and multi-agent swarm robotics. The Granulobot design is inspired by granular matter's highly strain-adaptive behavior and ability to transform between rigid and fluid-like states via a jamming transition. The remarkable features of granular matter arise from collective effects in assemblies made of simple building blocks and depend on inter-particles contact properties. Expanding beyond granular, jamming-based granular actuator systems and gear-based metamaterials by replacing passive grains with motorized particles adds new options for locomotion. In granular systems, overall malleable behavior can be achieved even with individually rigid sub-units by designing loose and detachable coupling. With the Granulobots, the inventors introduce a novel coupling design that enables continuous deformations and dynamical coupling in aggregates of self-assembling motorized units. In dense assemblies of multiple Granulobots, this allows for both solid- and liquid-like collective behaviors under a gravity field, which then can be exploited for a range of locomotion strategies. The result is a new form of active granular material that can, at the same time, form the building blocks of a soft robot.

Figures 1A, 1B, 1C:
FIG. 1A is a time-lapse of a swarm of Granulobot units self-assembling into an aggregate and then reconfiguring in accordance with an illustrative embodiment.
FIG. 1B depicts a coupling and actuation mechanism inside the Granulobot units in accordance with an illustrative embodiment.
FIG. 1C shows Granulobot aggregate behaviors that range from active liquid to active solid, depending on the type of control, in accordance with an illustrative embodiment.

In an illustrative embodiment, a swarm of Granulobot units, each with a single actuated degree of freedom that enables it to roll like a wheel on the ground, can self-assemble into larger granular aggregates. Units can then shift their positions simultaneously to generate arbitrary overall shapes. FIG. 1 depicts Granulobots, which utilize a modular platform bridging soft robotics and active granular materials. FIG. 1A is a time-lapse of a swarm of Granulobot units self-assembling into an aggregate and then reconfiguring in accordance with an illustrative embodiment. FIG. 1B depicts a coupling and actuation mechanism inside the Granulobot units in accordance with an illustrative embodiment. In one implementation, each two-wheeled unit uses magnetic coupling to connect to its neighbors. Inside a given unit, a single, rotary degree of freedom can be activated to generate torque, which enables this unit to roll along the frictional contact with its neighbor. In an alternative embodiment, multiple degrees of freedom may be actuated. FIG. 1C shows Granulobot aggregate behaviors that range from active liquid to active solid, depending on the type of control, in accordance with an illustrative embodiment. Controlling in open-loop enables behaviors resembling an active liquid with tunable viscosity and the ability to move and morph. In closed loop, individual units employ local, onboard feedback and the aggregate can exhibit a range of solid-like behaviors with locomotion gaits that include collective rolling and synchronized undulation. For small applied mechanical loads and sufficiently small bias voltages to the units, friction maintains the aggregate in a passive state that can resemble jammed granular matter or an elastic solid, depending on the units' spatial arrangement.

In one embodiment, an individual Granulobot unit includes a cylindrical body with an embedded control circuit and two permanent magnets that can rotate about the cylinder's axis. In such an embodiment, one magnet rotates freely, while the other one is actuated with a motor. This design allows individual units to move autonomously, mechanically connect with neighbors via magnets, and to form a continuously deformable aggregate, and apply torque to a neighbor (FIG. 1B). The aggregate's ability to reorganize its global torque state dynamically allows for collective shape-shifting into the vertical plane and against gravity.

Two modes of controlling the behavior of individual units provide access to a rich set of aggregate behaviors, with responses ranging from rigid and solid to viscous and liquid-like (FIG. 1C). Coupled with feedback control, an onboard encoder (or tachometer) sensor helps each Granulobot unit maintain the angular position of its actuated rotor, which leads to a solid-like (i.e., stiff elastic) response of the aggregate. Feedback control can also be used to generate spontaneous, self-organized oscillations. This makes it possible to implement locomotion strategies based on collective rolling or rhythmic undulation. In contrast, when employing open loop control, the angular position of the rotors is not maintained, allowing for irreversible deformation of the aggregate in response to mechanical load. This can be exploited to create a wide range of fluid-like behaviors of the aggregate, including locomotion, which cause the robot to act like a soft system that yields and conforms to external forces. Importantly, without applied power, a state with structural resistance can be maintained due to a static friction threshold. This is in contrast to other state-changing materials such as electro- and magnetorheological fluids that require large power consumption to maintain a rigid state, which limits their use in autonomous robotics.

Granulobot Design Principle

An individual Granulobot unit is itself an autonomous robot, cylindrical in shape with an internal actuator that controls a single rotary degree of freedom. An individual unit can magnetically couple to two other units to form more complex aggregates that can change their shape (FIG. 1A). The actuator, which in one embodiment is a brushed direct current (DC) motor, rotates a permanent magnet around a central axis as shown in FIG. 1B (actuated magnet). A second permanent magnet is attached to a passive, freely rotating shaft (free magnet) that can move at the same fixed radius around the cylinder's central axis. When units come into close proximity, the magnetic attraction couples an actuated magnet with a free magnet, which allows the units to transmit torque between themselves. When the motor drives the actuated magnet to rotate (straight arrow in FIG. 1B), the magnetic coupling forces the free magnet to follow by rotating around the robot central axis. Since Granulobots are designed with frictional, smooth gear-like surfaces, the produced torques can thus be transferred from the neighbor's free magnet to its robot body. This results in one unit rotating around the other (curved arrow in FIG. 1B).

The actuated magnet also acts as an eccentric weight that, when rotated, shifts the unit's center of gravity and causes an isolated Granulobot to roll. This enables locomotion of individual units and makes it possible for individual units to autonomously assemble into an aggregate once they come within the range of the magnetic coupling force (FIG. 1A). Docking is ensured by using opposite polarities for the magnets. Two possibilities arise: either both magnets have the same polarity in a given unit, in which case units with one polarity dock with units of the other polarity, or all units are identical with one polarity for the actuated magnet and the opposite polarity for the free magnet as shown in FIG. 1B. All results described herein are valid for both cases. Since the free magnet is not attached to any other structure, it slides freely along a circular track. Although several of the examples herein describe a connectivity of two units, i.e. each unit is magnetically coupled to no more than two neighbors, it is to be understood that the proposed design allows for the possibility of adding additional free magnets to enable more complex aggregate configurations. For example, in some embodiments, an individual unit can have two or more free magnets such that the unit can couple to three or more neighbors.

Once aggregates are formed, the system is able to reconfigure and control its behaviors using decentralized algorithms enabled through robot-robot interactions. Each Granulobot contains a battery-powered circuit that includes a transceiver with Wi-Fi capabilities that can be used for real-time robot-robot communication. Network (e.g., Wi-Fi) communication with a central computer can be used to gather data for post-analysis and for sending initialization commands to all robots. In one embodiment, control strategies are autonomously and decentrally implemented by the units through their interactions. Alternatively, control strategies can be provided by the central computer to control the robotic units.

Control of Individual Units and Aggregate Formation/Disassembly

In each individual Granulobot unit i, torque balance with respect to its actuated rotor leads to the following relation among the rotor's angular speed $\dot{\theta}_i$; the torque $\Gamma_{I,i}$ produced by an external load (e.g., from a neighboring unit or external perturbation); the voltage $U_i$ applied to the motor, which produces a torque $kU_i$; and the frictional torque from the motor's and unit's moving parts, which resists rotation and has magnitude $\Gamma_f > 0$ (taken to be the same for all units):

$$\eta_0\dot\theta_i = \begin{cases} 0 & |\Gamma_{l,i} + kU_i| \le \Gamma_f \\ \Gamma_{l,i} + kU_i - \Gamma_f \mathrm{sgn}(\dot\theta) & |\Gamma_{l,i} + kU_i| > \Gamma_f \end{cases}, \qquad \text{Eq. 1}$$

where $\eta_0\dot\theta_i$ is the torque produced by the motor's back Electro-Motive Force (EMF) and $k>0$ and $\eta_0>0$ are parameters characterizing the motor's load response.

As long as $|\Gamma_{l,i}+kU_i| \le \Gamma_f$ a Granulobot is effectively in a passive state and does not move. For initially unconnected units in a swarm with $\Gamma_l=0$, a voltage $U_i \ge \Gamma_f/k$ is required to start autonomous rolling, and enable units to connect with each other. Once the units have self-assembled, a change in the torque that a given unit exerts with its active rotor on its neighbor can lead the whole assembly to reorganize. As soon as an aggregate includes three or more units, shape-shifting can enable collective locomotion.

Figures 2A, 2B, 2C:
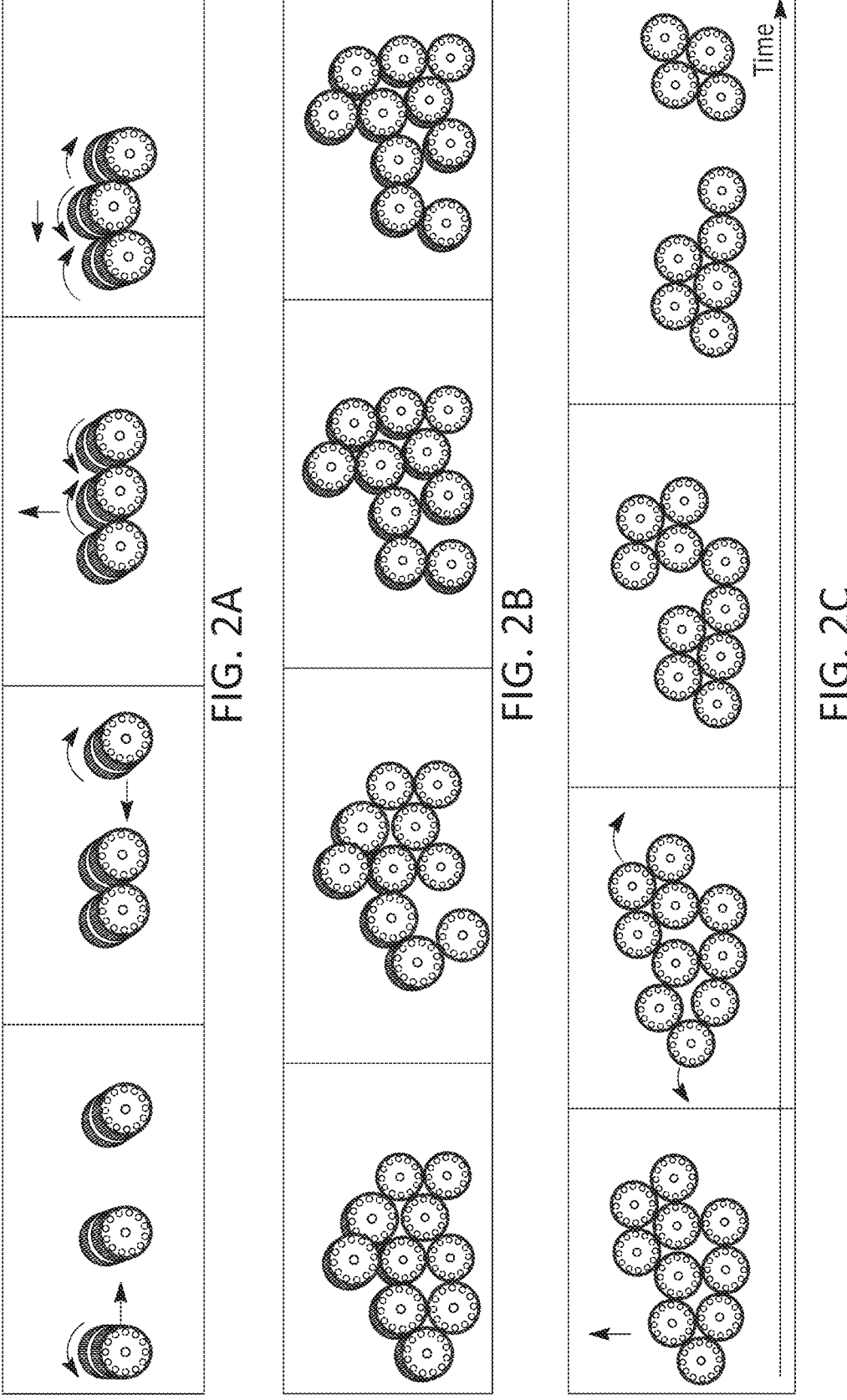
FIG. 2A shows how individual Granulobot units can roll and attach magnetically into larger assemblies, which then can move using a subset of units as wheels in accordance with an illustrative embodiment.
FIG. 2B shows that by exerting torque onto their neighbors, individual units as well as groups of units can reposition themselves and thus rearrange the assembly's overall shape in accordance with an illustrative embodiment.
FIG. 2C shows that by exerting torque larger than the magnetic binding between neighbors, units can split off and form autonomous robots on their own in accordance with an illustrative embodiment.

FIG. 2 shows self-assembly, shape-shifting, and dynamic reconfiguration of individual units into aggregates. In FIG. 2, arrows represent the actuated magnets' direction of rotation, and also Granulobots in the process of reconfiguration. FIG. 2A shows how individual Granulobot units can roll and attach magnetically into larger assemblies, which then can move using a subset of units as wheels in accordance with an illustrative embodiment. As shown, in the right image of FIG. 2A, the middle unit has lifted off the ground, which allows the aggregate to move (here to the left) by having all wheels that touch the ground rotate in the same direction. FIG. 2B shows that by exerting torque onto their neighbors, individual units as well as groups of units can reposition themselves and thus rearrange the assembly's overall shape in accordance with an illustrative embodiment. FIG. 2C shows that by exerting torque larger than the magnetic binding between neighbors, units can split off and form autonomous robots on their own in accordance with an illustrative embodiment.

In larger aggregates, applying torque can physically move units on top of others and deform the assembly into an arbitrary configuration within the vertical plane (FIG. 2B). At the points where units contact each other, magnetic attraction provides a normal force strong enough to ensure no-slip gear-like coupling, while units that touch in the absence of magnetic attraction can slide as long as forces exceed the static friction arising from the units' smooth gear surface. These two frictional behaviors prevent units from seizing when three consecutive units are in contact with each other.

During such reconfiguration, geometrical constraints that prevent a unit from rotating about its neighbor's central axis can still arise. If further rotation is nevertheless forced and the actuation torque applied becomes stronger than the magnetic coupling, the actuated magnet will separate from its counterpart in the neighboring unit. An ability for individual units to detach thus emerges from the collective properties of the assembly, without the use of any additional actuator. This allows the reorganization of neighbors in aggregates, and the creation of separate entities that can function as autonomous robots (FIG. 2C).

Choosing a functional form for the voltage $U_i$ in Eq. 1 makes it possible to generate different behaviors for the individual Granulobot units and therefore to design a rich set of collective mechanical behaviors for the aggregate. In the following equation, a general form is used for each unit i that combines constant torque and position control by setting a voltage bias $u_i$ and monitoring the angular position $\theta_i$ from an encoder embedded in each unit's circuitry:

$$U_i = u_i - \left(\alpha\frac{\eta_0}{k}\dot\theta_i + \frac{G}{k}\theta_i\right). \qquad \text{Eq. 2}$$

The parameters $G/k>0$ and $\alpha\eta0/k$, with $\alpha\in[-1,\infty[$, determine how the drive voltage responds to changes in the rotor's movement, and can be thought of as the coefficients of a proportional-derivative (PD) feedback loop ($K_p$ and $K_d$, respectively). Using such active control, a unit's electromechanical behavior for $|\Gamma_{l,i}+kU_i| \ge \Gamma_f$ in Eq. 1, i.e. beyond the passive state, is then described by:

$$ku_i = \Gamma_{l,i} - \Gamma_f\mathrm{sgn}(\dot\theta) = (1+\alpha)\eta_0\dot\theta_i + G\theta_i. \qquad \text{Eq. 3}$$

In Eq. 3, G tunes the Granulobot's ability to maintain its rotor at a targeted position under load, thus acting analogous to a torsion spring constant, while $(1+\alpha)\eta_0$ tunes the rotor's damping, analogous to viscous dissipation; $\alpha>0$ increases the damping generated by the back emf $\eta_0\dot\theta_i$ while $\alpha=-1$ actively cancels it. The variable $ku_i$ corresponds to a torque bias produced by the motor.

Within this framework, driving Granulobots in 'open loop' as shown in FIG. 1C corresponds to setting parameters $\alpha=G=0$, i.e. ignoring onboard sensor information about $\theta$ and $\dot\theta$, and controlling the system only via the bias voltages $u_i$, while 'closed loop' refers to $\alpha\ge-1$ and $G>0$ so that the sensor data informs the response. Included below is a discussion of how choices for these parameters control the aggregate behavior indicated in FIG. 1C. Included below is a discussion of how collective states can be leveraged for different aggregate locomotion control strategies that can be used in different environmental conditions.

Granulobot Aggregate Behavior

Figure 3:
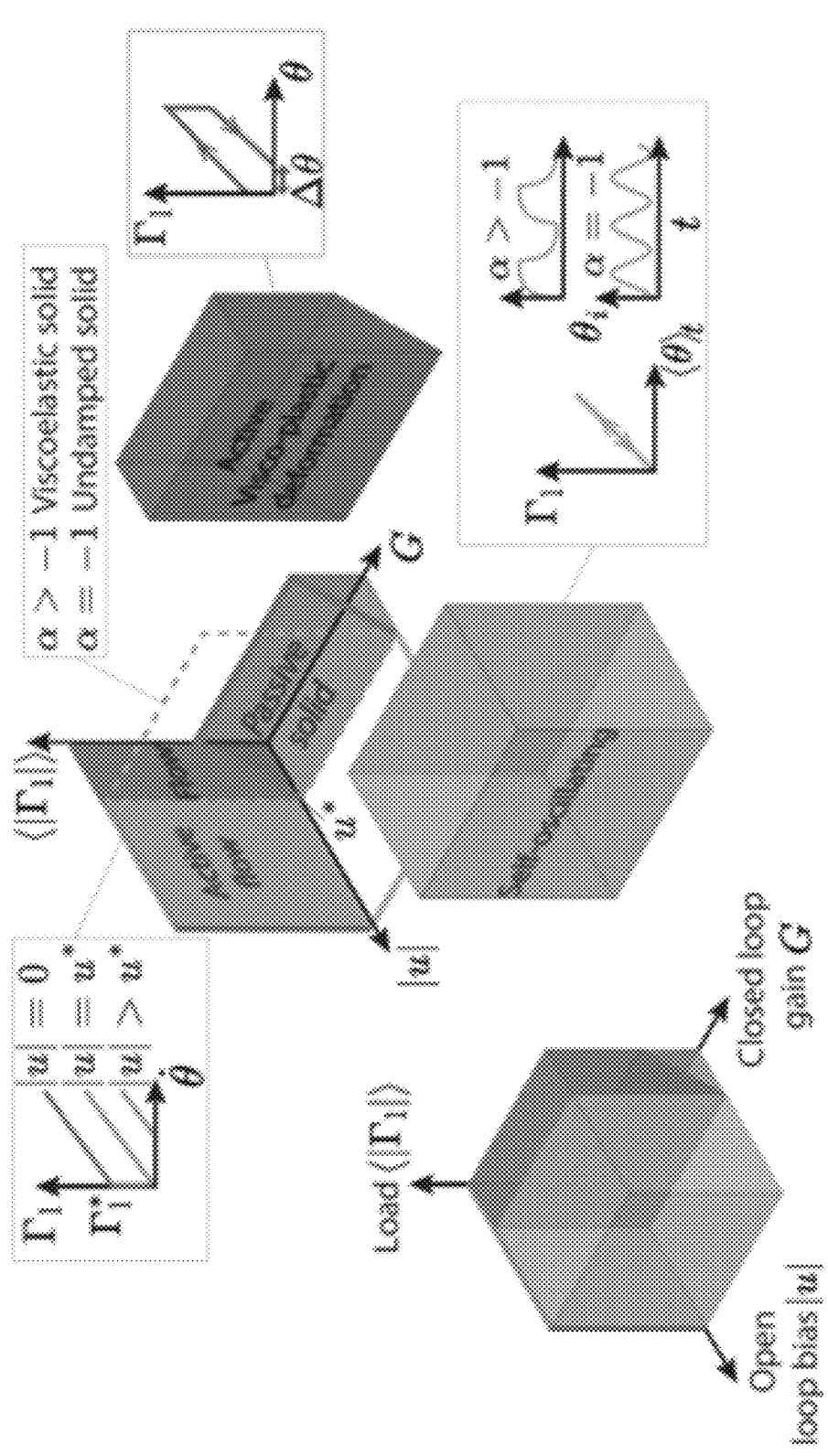
FIG. 3 depicts different states a Granulobot aggregate can exhibit as a function of open loop voltage bias |u|, closed loop proportional gain G, and average applied torque load $\langle \Gamma \rangle$ (lower left) in accordance with an illustrative embodiment.

FIG. 3 depicts different states a Granulobot aggregate can exhibit as a function of open loop voltage bias |u|, closed loop proportional gain G, and average applied torque load $\langle\Gamma\rangle$ (lower left) in accordance with an illustrative embodiment. The exploded view (center) shows in more detail the parameter dependence of the different states. Schematic diagrams in the boxes indicate the associated load responses of individual units. As discussed in more detail below, measured mechanical behaviors of close-chain Granulobot aggregates are shown for the active liquid-like state in FIG. 4C (relaxation time scale corresponding to an effective viscosity) and FIG. 5A (strain-independent load response), for the visco-plastic solid state in FIG. 5A (hysteretic load response), and for the active, self-oscillating solid state in FIG. 5B (elastic load response).

As discussed above, FIG. 3 shows the different states of a Granulobot aggregate as a function of average applied torque load ($|\Gamma_l|$) to the aggregate, and two of the control parameters, the voltage bias magnitude |u| and the gain G of the feedback for the angular rotor position. Each unit within the aggregate experiences a typical torque load of magnitude $\langle|\Gamma|\rangle$, while both |u| and G are set equal for all Granulobots (the sign of $\langle|\Gamma_{l,i}|\rangle$ and $u_i$ can vary from unit to unit). The dissipation parameter $\alpha$ scales the effective viscosity and the relaxation time respectively in the liquid and the solid state of the aggregate, but for $\alpha \geq -1$ does not change the behaviors qualitatively. The load responses of individual units corresponding to the different aggregate states are sketched in the boxes. The following sections of the application describe the different behaviors that corresponds to the states, and provide experimental data for closed-chain aggregates of N=8-10 in FIGS. 4, 5, 6.

Passive State.

If all biases $u_i = |u|$ are sufficiently small, the aggregate remains static until the frictional torque $\Gamma_f$ in a unit can be overcome. This is the passive state, as shown in FIG. 3. When contacts among the units in the aggregate involve only magnetic linkages, the passive aggregate has some degree of elasticity reflecting the stiffness of the magnetic coupling. When both magnetic and nonmagnetic contacts are involved, as in densely packed configurations where a given unit can also be in frictional contact by touching other units, this can create geometric constraints and lead to a granular jammed state with potentially very little elastic behavior (FIG. 1C). Such a jammed state's response to load will depend strongly on the specific overall configuration of units within the aggregate.

In the following, to simplify the presentation, aggregates where all non-magnetic contacts slip easily and their contribution to friction can be neglected are considered. In this case, the boundaries of the passive state in FIG. 3 are defined by the weakest coupling between units in the aggregate, which corresponds to Granulobots where the bias $u_i$ has the same sign as the load, thus effectively reducing the frictional resistance. This leads to a yield torque $$\Gamma_l^* = \Gamma_f - k|u|,$$

which vanishes once $|u|$ exceeds $u^* = \Gamma_f/k$, and gives rise to the wedge shape of the passive state in FIG. 3.

Liquid-Like States.

Liquid-like states occupy the $(|u|, \Gamma_l)$ plane in FIG. 3, where G=0. The bias voltage $u^*$ delineates behavior akin to a yield stress fluid for $u < u^*$ and corresponding to an active fluid for $u > u^*$. For a highly deformable, steady liquid-like load response to emerge, neighboring magnetically coupled units ideally all need to rotate in opposite directions. In an aggregate comprising a closed chain of an even number of units N, this translates into $$\sum_i^N \dot{\theta}_i \approx 0.$$

Figures 4A, 4B, 4C:
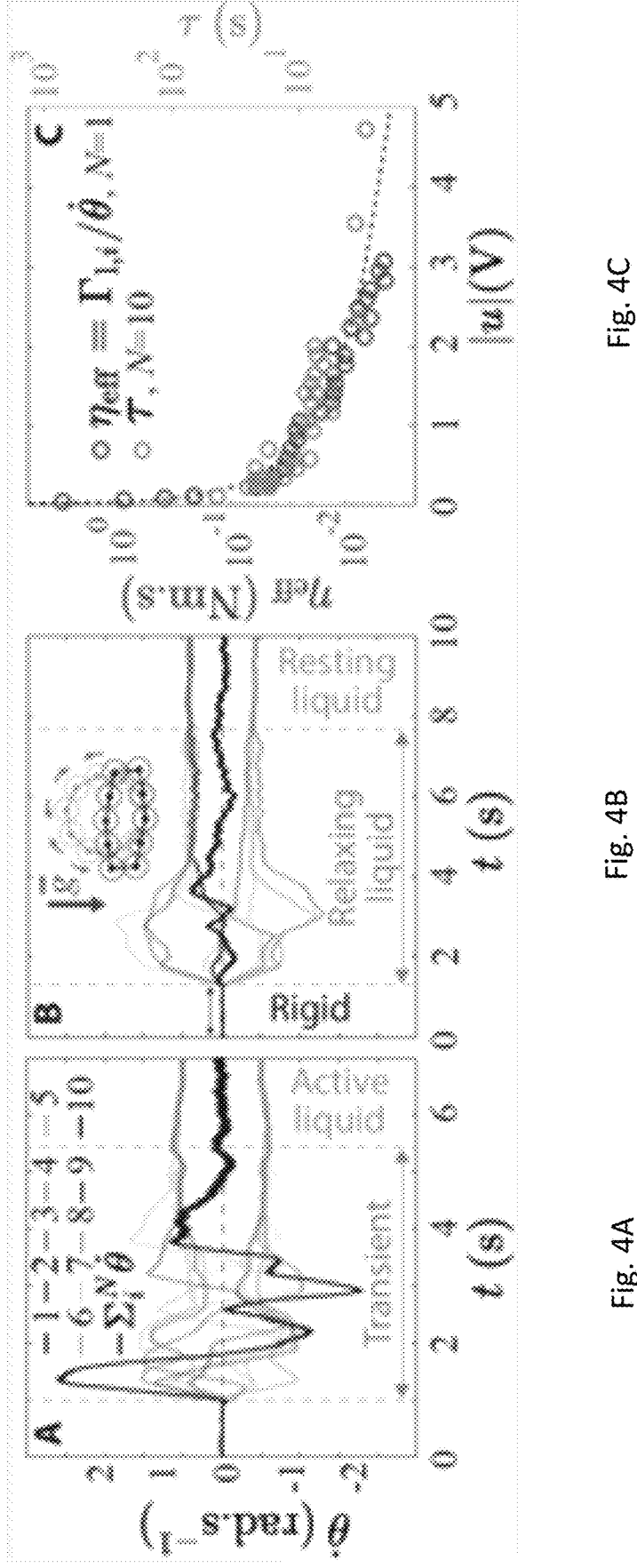
FIG. 4A depicts rotation speeds of individual units as a function of time for an aggregate placed horizontally with $u_i = |u| \mathrm{sgn}(\dot{\theta})$ in accordance with an illustrative embodiment.
FIG. 4B depicts rotation speed of individual units as a function of time during a vertical collapse experiment with |u|=1 V.
FIG. 4C depicts evolution of a unit's damping parameter $\eta_{\mathit{eff}} = \Gamma_{L,i}/\dot{\theta}_i = \eta_0 + k(u^* - |u|)\dot{\theta}_i^{-1}$, evaluated from measurements of $\dot{\theta}_i$ on a single unit, as a function of voltage bias |u|, for a fixed load $\Gamma_{L,i}$=0.020 Nm, where m is the unit's mass, r its radius, and g the acceleration of gravity in accordance with an illustrative embodiment.

Such a regime is reached autonomously by setting $u_i = |u|\,\mathrm{sgn}(\dot{\theta}_i)$ in each of the individual units (in this case onboard sensing of the rotor's direction of rotation is performed). The mechanical coupling then drives a self-organization process that, after a brief transient regime, converges to a state with bias voltages of opposite sign on neighboring units, $u_i = -u_{i-1} = (-1)^i |u|$ (FIG. 4A). Alternatively, the liquid state can be achieved in fully open loop, with no sensing of $\mathrm{sgn}(\dot{\theta}_i)$, by initializing neighboring units via a global command to use $|u|$ of opposite signs (See Methods), and with $\alpha=0$. From Eq. 3, for G=0 the load response of all individual units is described by an equation of the form:

$$\Gamma_{l,i} = (1 + \alpha)\eta_0 \dot{\theta}_i + k(u^* - |u|), \qquad \text{Eq. 4}$$

which is written here for positive $\Gamma_{l,i}$ and therefore $\dot{\theta}_i > 0$ and $\mathrm{sgn}(\dot{\theta}_i) = 1$.

FIG. 4 shows the active liquid-like state in a closed-chain aggregate with N=10 units, $\alpha=0$, and G=0. FIG. 4A depicts rotation speeds of individual units as a function of time for an aggregate placed horizontally with $u_i = |u|\,\mathrm{sgn}(\dot{\theta})$ in accordance with an illustrative embodiment. In FIG. 4A, $|u|=1$ V. FIG. 4B depicts rotation speed of individual units as a function of time during a vertical collapse experiment with $|u|=1$ V. FIG. 4C depicts evolution of a unit's damping parameter $\eta_{eff} = \Gamma_{l,i}/\dot{\theta}_i = \eta_0 + k(u^* - |u|)\dot{\theta}_i^{-1}$, evaluated from measurements of $\dot{\theta}_i$ on a single unit, as a function of voltage bias $|u|$, for a fixed load $\Gamma_{l,i} = 0.020$ Nm, where m is the unit's mass, r its radius and g the acceleration of gravity in accordance with an illustrative embodiment. The black dotted line in FIG. 4C is $\eta_{eff}$ evaluated using the analytical form of $\dot{\theta}_i$ obtained from Eq. 3, and for a typical load $\Gamma_{l,i} = mgr$. FIG. 4C also depicts evolution of the relaxation time scale $\tau$, measured for the collapsing chain, as a function of voltage bias $|u|$.

If $|u| < u^*$, this relationship between applied load and resulting rotation speed has the same functional form as the relationship between applied stress and shear rate for a yield stress fluid (see sketch of $\Gamma_l(\dot{\theta})$ in FIG. 3). For such fluid an effective, rate-dependent viscosity $\eta_{eff}$ is defined by the ratio of stress to shear rate. By analogy a unit's viscous damping is defined as $\eta_{eff} = \Gamma_{l,i}/\dot{\theta}_i$.

To compare this with the viscous behavior of a multi-unit Granulobot aggregate in its liquid state, one can characterize the collective viscous flow by performing experiments where the collapse of a circular chain units is timed (FIG. 4B). The inventors chose an initial configuration such that before the collapse, for u=0, the load for all units in the aggregate is slightly below their frictional yield torque and therefore the chain's circular shape is maintained. The bias $|u|$ is then switched to drive the system into the liquid state and measure the relaxation time $\tau$ needed for the aggregate to reach its minimum potential energy, i.e., its equilibrium state. To bypass the transient phase of the self-organizing process and ensure the system behaves as a liquid as soon as the voltage bias is applied, the relation $u_i = (-1)^i |u|$ is enforced. It is noted that adjacent units rotate in opposite directions and that this complex sequence of interdependent rotations emerges simply in response to external forcing. As such, it can accommodate arbitrary starting configurations and will always proceed in a liquid-like manner toward the equilibrium configuration that minimizes gravitational potential energy.

FIG. 4C shows measurements of $\eta_{eff}$ and $\tau$ as a function of the voltage bias $|u|$. The plotted $\eta_{eff}$ is for an individual unit, obtained by applying a fixed torque $\Gamma_{l,i}$ and measuring the resulting angular speed $\dot{\theta}_i$ as a function of $|u|$. For comparison with the collapse experiments, the torque load is chosen slightly lower than the friction torque, such that the rotor is also static at u=0. The experimental data are well described by an analytical form of $\eta_{eff} = \Gamma_{l,i}/\dot{\theta}_i$ using Eq. 4 to obtain $\dot{\theta}_i$ (black dotted line). One can observe that the aggregate collapse time $\tau$ reproduces this behavior, consistent with a collective viscosity that scales with bias $|u|$ in the same way as $\eta_{eff}$. This demonstrates how the collective viscosity can be tuned by setting the viscous load response of the individual units via $|u|$. Changing the damping via a, which is set to zero in all data shown in FIG. 4, only scales the behavior with a prefactor.

For vanishing voltage bias $|u|$, the passive state is approached and $\tau$ and $\eta_{eff}$ diverge. Conversely, as $|u|$ is increased to the point that it reaches $u^*$, the yield stress vanishes and the aggregate viscosity attains a load-independent value that scales as $\eta_{eff} \sim (1+\alpha)\eta_0$. Effectively, the system now behaves like a Newtonian liquid. If $|u|$ is increased above u*, individual units rotate with finite speed $$\dot{\theta}_i = \frac{k(|u| - u^*)}{(1 + \alpha)\eta_0}$$

already in the absence of any significant load (see e.g. the final equilibrium state in FIG. 4B). In this state the aggregate behaves in a manner that can be characterized as an active liquid with low effective viscosity.

Figures 5A, 5B:
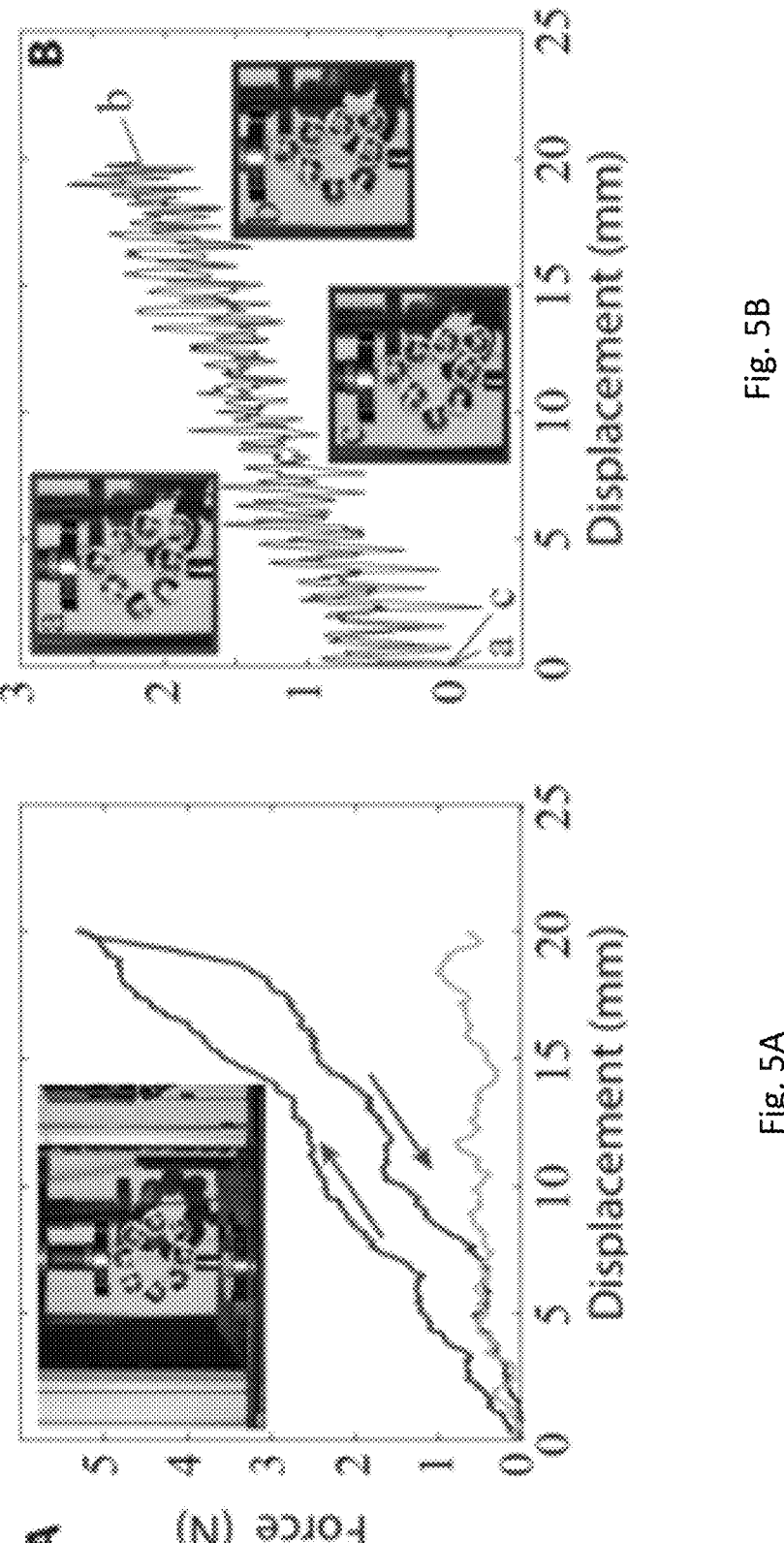
FIG. 5A shows a liquid-like response with G=0, |u|=0.15 V≃u*0>u*, and hysteretic response in the viscoplastic solid state with G=2.0 Nmrad$^{-1}$, |u|=0.1 V<u* in accordance with an illustrative embodiment.
FIG. 5B shows a reversible elastic response in the self-oscillating solid with G=2.0 Nm rad$^{-1}$ and |u|=1 V>u* in accordance with an illustrative embodiment.

FIG. 5 shows tensile load response of a closed-chain aggregate, having core-displacement curves with $\alpha=-1$, N=8 units, and measured at a displacement rate of 1 mm s$^{-1}$. FIG. 5A shows a liquid-like response with G=0, $|u|$=0.15 V$\simeq$u*0>u*, and hysteretic response in the viscoplastic solid state with G=2.0 Nmrad−1, $|u|$=0.1 V<u* in accordance with an illustrative embodiment. The inset is a still frame from a video of the Granulobot chain in the Instron materials tester used to generate the data in FIG. 5A and FIG. 5B. In this image the back side of units is visible, showing the circuit board and the battery. FIG. 5B shows a reversible elastic response in the self-oscillating solid with G=2.0 Nm rad$^{-1}$ and $|u|$=1 V>u* in accordance with an illustrative embodiment. The periodic variations are due to shape oscillations of the aggregate. The insets show enlarged images of the Granulobot chain in the Instron showing identical configurations at the beginning (a) and end (c) of the load cycle, and elongation when the maximum strain was applied (b).

The bottom curve in FIG. 5A presents data from a constant speed tensile test when $|u|$=u*, i.e. when $\Gamma_f$ is actively compensated for by the voltage bias, so the rotor is still static when not loaded. A quasi-flat, i.e. strain independent behavior, was observed consistent with what is expected for a Newtonian liquid-like response. In practice, a unit starts to rotate at a slightly larger bias than the estimate from calibration torque-displacement curves $$u_0^* > u^* = \Gamma_f / k.$$

This can be explained by a static friction at zero angular speed that is larger than the kinetic friction producing $\Gamma_f$ (FIG. 8D).

Solid-Like States.

Solid-like states use a feedback sensor to sense the rotor movement and drive it toward its equilibrium angular position during a load perturbation. With increasing G, the response of individual units, and thus also of the aggregate, becomes more elastic and rigid.

Considering a bias that always acts against the frictional torques $u_i=|u|\mathrm{sgn}(\dot{\theta}_i)$, Eq. 3 can be written as:

$$\Gamma_{l,i} = G\theta + (1 + \alpha)\eta_0\dot{\theta}_i + k(u^* - |u|)\mathrm{sgn}(\dot{\theta}_i). \qquad \text{Eq. 5}$$

When $|u|$=u* (vertical dotted plane in FIG. 3), this behavior corresponds to a viscoelastic solid, the response of a damper and a spring in parallel. In this specific state, vanishing damping, i.e. $\alpha=-1$, corresponds to an undamped mass-spring oscillator.

When $|u|$<u*, the unit's response is analogous to a viscoplastic solid, which corresponds to a spring, a damper and a frictional element in parallel. In this regime, where the characteristic response time of a rotor is $\tau=(1+\alpha)\eta_0/G$, effective position control with a fast response is achieved by choosing a positive $\alpha$ and a large G. Otherwise, if $\alpha=-1$, the damping $\eta_0\dot{\theta}_i$ is actively compensated for and a perturbation of the rotor that overcomes $\Gamma_f$ leads to steady undamped oscillations. As the biases will not completely cancel the frictional torques in individual units, if G is not large enough, deformation will exhibit significant hysteresis $\Delta\theta$=k (u*−$|u|$)/G. As shown in the tensile test data presented in FIG. 5A, the overall aggregate will then also respond to load with some hysteresis, i.e. plasticity.

If one chooses biases $|u_i|$>u*, the response of the aggregate to a quasi-static tensile test no longer is hysteretic but becomes reversible, as shown in FIG. 5B. This is the signature of an elastic solid. However, unlike an ordinary elastic solid, in this state the internal dynamics of the aggregate is more complex: each rotor's unit is driven away from its equilibrium angle and oscillations arise spontaneously, even without applied load. The units are driven by the bias to "self-oscillate" such that, when isolated, they exhibit well defined limit cycles with amplitude and frequency fixed by $|u|$, G and $\alpha$ (FIG. 6A).

FIG. 6 depicts a self-oscillating solid-like state in a closed-chain aggregate. Granulobots are laid horizontally onto a slippery surface. G=1.0 Nm/rad and u*=0.11 V. FIG. 6A shows phase space $(\theta,\dot{\theta})$ of a single isolated unit for different $|u|$ and $\alpha$ in accordance with an illustrative embodiment. In FIG. 6A, $|u|$=2 V, $\alpha=-0.9$; $|u|$=1 V, $\alpha=-0.9$; $|u|$=1 V, $\alpha=-0.5$; $|u|$=1 V, $\alpha=0$. In FIGS. 6B-6H, N=10 units. FIG. 6B shows angle as a function of time for two coupled neighboring units in the chain aggregate, after turning all units on at t=0 in accordance with an illustrative embodiment. In FIG. 6B, $|u|$=1.0 V. FIG. 6C depicts limit cycles followed by all coupled units in the steady regime of the experiments corresponding to FIG. 6B in accordance with an illustrative embodiment. FIG. 6D shows maximum of power spectrum averaged over N=10 units $$\langle S^{max}\rangle = \frac{1}{N}\sum S_i^{max}$$

as a function of $|u|$, where $$S_i^{max}$$

is the maximum of the single-sided amplitude spectrum determined by applying FFT to $\theta$(t) in accordance with an illustrative embodiment. Units are in the same aggregate configuration as in FIGS. 6B-6C, with $\alpha=-0.9$. The variable $|u|$ is gradually increased from 0 to 2 V, and decreased back to 0 V. FIG. 6E shows limit cycles observed in an aggregate with $\alpha\in[-0.9,-0.6]$, $|u|$=1.0 V in accordance with an illustrative embodiment. FIG. 6F shows a power spectrum observed for each of the units when coupled into a ring aggregate in accordance with an illustrative embodiment. FIG. 6G shows a power spectrum observed for each of the units when isolated in accordance with an illustrative embodiment. FIG. 6H shows shape deformation $\gamma$=(A−A (t=0))/A(t=0) over time, with A the area covered by the assembly, for an aggregate with $\alpha_i=\alpha$ and with a range of $\alpha$ in accordance with an illustrative embodiment.

As individual units' rotors are now subject to inertia, which manifests itself through spring-like oscillation, they can transfer momentum to each other when magnetically coupled in an aggregate, and thus perturb their neighbor's dynamical state. In a chain of units, after an initial transient, such purely mechanical coupling can lead to the self-organization of collective oscillatory states with well-defined global limit cycles that remain unchanged over time. Specifically, in a closed loop of an even number of units that all have the same parameters, and that remain unperturbed, a synchronization process was observed. FIG. 6B displays such a situation in an aggregate of N=10 units, by showing the angles of two consecutive units as a function of time, right after turning them on. After a transient, units lock in their phase and amplitude. The frequency and amplitude observed in the aggregate are the same as for an isolated unit (FIG. 6C).

Moreover, the transition between a disordered dynamics to a synchronized behavior is strongly hysteretic (FIG. 6D), with long transient regimes at biases close to u*, and almost instantaneous transitions at larger biases. This hysteresis implies that, for a certain range of bias values |u|, the Granulobot aggregate can be in two states, with and without limit cycle. With a sensitivity that can be tuned with the voltage bias within this range, this means that switching between these behaviors can be triggered by mechanical perturbations from the environment the robot interacts with, without electronic feedback.

Remarkably, when the system synchronizes, consecutive units' phases alternate between 0 and $\pi$, which corresponds to $\dot{\theta}_i = -\dot{\theta}_{i+1}$, and $$\sum_{i}^{N} \dot{\theta}_i \sim 0.$$

In this situation, the contour of the chain remains static in time with no deformation. This collective steady state is labeled a self-oscillating solid (a similar phenomenology is observed when choosing $u_i$ across all units with the same sign, regardless of $\Gamma_f$). In this state, perturbations that are too small to switch the aggregate to disordered dynamics can still affect its behavior. For example, placing a previously synchronized closed-chain loop upright in a gravity field when performing a tensile test leads to small global periodic deformations of the structure that can be seen by the oscillations in the force signal in FIG. 5B. Remarkably, on average the response to loading remains that of a purely elastic solid, with collective self-organized properties that ensure continuous deformation across all of the aggregate.

Such global shape oscillation can also be triggered internally when units are assigned different parameters and thus exhibit different self-oscillation properties. In such a setting, one can still observe collective limit cycles characterized by self-organization with frequency locking. FIG. 6E shows such collective limit cycles for an assembly with a distribution of $\alpha$ in the range [−0.9,−0.6]. FIGS. 6F and 6G compare the frequency spectra of each unit coupled in an aggregate with those for isolated units. It can be seen that the mechanical coupling selects a single collective frequency despite the spread in frequencies of isolated units, with phases that are locked in time. Meanwhile, there remains a spread in oscillation amplitudes. To accommodate this, the phases between consecutive units in a chain are shifted and the aggregate's contour deforms globally and periodically.

FIG. 6H shows the evolution of such deformation as a function of time for an assembly with the same range of a as in FIGS. 6E and 6F, and compares it with the observation for an assembly with identical parameters among all units, as in FIGS. 6B and 6C. With variable damping, the units no longer synchronize and a wave propagates instead.

From Collective States to Decentralized Locomotion Tasks

The behaviors summed up in FIG. 3 show a wide range of responses to external loads and constraints. Such mechanical feedback from the environment can be seen as an emergent and decentralized collective mechanical sensing ability that can be harnessed for control. These collective states can be driven out of their effective equilibrium to produce dynamical shape shifting solely by preventing individual units behavioral state, enabling decentralized deformation based tasks. Furthermore, the use of voltage control via a single functional form (Eq. 2) allows to continuously transition between states of different response type and switch autonomously between strategies depending on environmental or computation constraints. This ability is demonstrated by implementing three different locomotion gaits. Using the liquid-like, the self-oscillating, and the viscoplastic mechanical responses, a robot can move over an obstacle without sensors, self-organize into a steadily translating aggregate, either on frictional or slippery surfaces (solely via mechanical coupling), and can move quickly and efficiently using its own inertia when it maintains overall rigidity.

Described below is a morphing liquid embodiment for sensorless obstacle management. As discussed, one can leverage the aggregate's ability to change its rigidity and behave as a liquid to locomote over an obstacle, using only mechanical feedback from the environment. FIG. 7 shows illustrative Granulobot locomotion strategies. Specifically, FIG. 7A shows a liquid-like gait using a set of voltage biases with shifted phases in an aggregate of N=8 units ($u_0=0.7$ V and A=2.4 V) in accordance with an illustrative embodiment. FIG. 7B depicts snapshots of a Granulobot aggregate using the gait (FIG. 7A) to move over an obstacle in accordance with an illustrative embodiment. FIG. 7C shows a limit cycle reached by a closed chain aggregate in the self-oscillating solid state with N=6 units, after turning unit $\tau=1$ off (|u|=2 V, $\alpha=-0.9$ and G=1.0 Nm/rad) in accordance with an illustrative embodiment. FIG. 7D depicts snapshots of a steadily moving self-organized aggregate corresponding to the gait in FIG. 7C in accordance with an illustrative embodiment. FIG. 7E depicts a limit cycle of an open chain aggregate in the self-oscillating solid state with N=8 units, after turning unit $\tau=7$ off (|u|=1 V, $\alpha=-0.9$ and G=0.5 Nm/rad) in accordance with an illustrative embodiment. FIG. 7F shows snapshots of a steadily moving self-organized aggregate corresponding to the gait in FIG. 7E in accordance with an illustrative embodiment. FIG. 7G depicts a limit cycle from a leader-follower scheme to implement a propagating perturbation (inertial shape-shifter) in accordance with an illustrative embodiment. Choosing |u|=0, G=10.0 Nm/rad and $\alpha=1.0$, units can be controlled in displacement (large G with |u|<u*), enabling fast collective motion with small deformation by turning into a "pumping" wheel. FIG. 7H shows snapshots corresponding to the gait of FIG. 7G in accordance with an illustrative embodiment. The solid dot corresponds to unit $\tau=1$. In FIGS. 7C, 7E, and 7G the units of $\theta$ and $\theta^*$ are rad and rad/s, respectively.

For an aggregate to deform liquid-like while translating its center of mass without sensor readout, the inventors identified a form of $u_i$ that implements a gait while satisfying 17                                                                            18

$$\sum_i^N \dot{\theta} \sim 0.$$

It is shown that this can be achieved with α=G=0 by using the functional form for the individual $u_i$ displayed in FIG. 7A, which is inferred from a reverse kinetic approach. This gait relies on synchronous periodic deformation that can be implemented with both closed or open chain configurations, by allowing neighboring units to wirelessly synchronize their clocks and correct phase drift over time. FIG. 7B shows a snapshot of an aggregate "flowing" over an obstacle to pass it.

An undulator refers to an emergent aggregate gait with coupled oscillators. FIG. 6H shows that a spread in the units' oscillation properties in an aggregate leads to limit cycles that generate periodic collective shape deformations. Even when there is no spread, similar collective shape deformations can be triggered by mechanical interaction with the environment. Specifically, when an aggregate of synchronized units, all with equal control parameters, is placed vertically onto a non-slip surface, limit cycles remain. However, small regular left-right periodic deformations emerge due to frictional constraints because units that are in contact with the non-slip surface cannot rotate as much as the others. In such a setting, perturbing this state further by turning off one unit modifies the limit cycle (FIG. 7C), breaks the left-right symmetry of the collective periodic deformation, and amplifies it. This can lead to a sustained locomotion of the aggregate (FIG. 7D) without the use of wireless communication, solely relying on unit-unit mechanical interactions, and hence minimal computation. To locomote with a closed chain, the left-right symmetry of the periodic deformation can also be broken by using an odd number of units with identical oscillation parameters. In an open chain configuration, periodic deformation can be used to locomote on a slippery surface. In that case, perturbing the properties of an oscillator in one portion of the chain can trigger an undulating deformation that alternates contact with the ground periodically between different sections of the chain (FIGS. 7E and 7F).

To implement an inertial shape-shifter, the inventors demonstrate the implementation of a local displacement control approach to generate fast and efficient rolling gaits in rigid solid aggregates. This is achieved via fast and over-damped local feedback loops in the viscoplastic region of FIG. 3, with large G, |u|=0 and an optimal α. Small, appropriately timed shape perturbations are propagated through a ring-like chain of coupled units to generate coordinated locomotion that leverages the assembly's overall inertia. The shape perturbations are enforced by controlling the rotors' absolute angles as a function of time. The aggregate's locomotion is triggered in a decentralized way by sending the same message once to all units. Neighbor-neighbor communication and a leader-follower algorithm then implement a predefined angle perturbation that propagates through the chain. Depending on the algorithm parameters, the aggregate can either crawl or roll, the latter demonstrating the faster and most energy efficient locomotion strategy as only small rotor displacements are required (FIGS. 7G and 7H).

Thus, the Granulobot represents a novel robotic system inspired by granular material where motorized units can flexibly and reversibly couple with each other and self-assemble into larger aggregates. A minimal design with a single activated degree of freedom per unit enables aggregates to reconfigure dynamically and to transition between solid- and liquid-like responses under gravity. In contrast with modular robotic systems that require successive steps of detachment and reattachment of individual units to change their shape, a Granulobot aggregate can deform by continuous local displacement, similar to a deforming soft material. Since such deformation is a function of the Granulobots' dynamical states, this results in the wide range of collective mechanical behaviors shown in FIG. 3. Furthermore, as these different response properties are all encoded in the functional form of the control voltage $U_i$, this allows to transition continuously between liquid-like behavior associated with open loop control, and solid-like behavior where an onboard feedback loop monitors the local rotor displacement sensor.

The properties associated with several of the Granulobot aggregate states make it possible to use mechanical interaction with the environment to implement decentralized locomotion strategies without the use of electronic environmental sensing and at minimal computation cost. In the liquid-like state, this allows an aggregate to pass over an obstacle by "flowing" over it. In the self-oscillating solid state, Granulobots self-organize strictly via mechanical coupling into well-defined limit cycles. In this setting, changes in the control parameters, as well as in the mechanical environment where robots operates in, can trigger periodic deformations. Using this feature, aggregates can self-coordinate periodic shape changes to slide on a slippery surface and roll on a no-slip surface, thus leveraging physical interactions with their environment to generate locomotion. Furthermore, the bistability observed in Granulobot aggregates for a range of bias voltages enables a minimal, purely mechanical 'decision-making.' Specifically, sufficiently large external perturbations can switch the behavior of the system between disordered and self organized states without requiring electronic sensing. Reminiscent of mechanisms found in living systems, this opens up a promising perspective in distributed robotics to develop collective behavioral capabilities.

The viscoplastic state makes it possible to maintain an aggregate shape and exhibits less sensitivity to perturbation compared to the self-oscillating solid. This state is more amenable to the implementation of traditional displacement control, where parameters can be tuned for a rigid response that is insensitive to external environmental loading, similar to controlling a robotic arm. In the experiments with closed-chain aggregates, this is advantageous when implementing fast locomotion using inertia. It also demonstrates the ability of the design to combine in a decentralized way the physical approach with more widely used kinematic planned strategies. This is also the regime in which controlled neighbor reconfiguration can be implemented in a usage more similar to existing modular robotic systems. But such reconfiguration can happen spontaneously in any of the accessible states through collective mechanisms.

The different locomotion strategies explored here can be viewed as first examples that demonstrate the versatility of the Granulobot platform. As such, it is anticipated that many additional locomotion strategies could be found as well as possible new tasks. A promising way to explore them could be to implement machine learning approaches. A more ambitious but crucial step would be to implement learning in a fully decentralized way, which could allow aggregates to select autonomously strategies that are relevant to the environment and constraints they encounter. In this context, conventional machine learning approaches are conceptually challenging to apply since error functions are ultimately estimated centrally. It is believed that the Granulobot platform offers a promising perspective for tackling this problem by combining the collective behavior emerging from mechanical interactions among the units with local error optimization executed in the units' microcontrollers.

Additionally, more complex packing and coupling structures can be created. This could be achieved by increasing each unit's connectivity with additional freely rotating magnets (e.g., 2, 3, 4, etc.) and, in dense packing configurations, exploiting the metastability associated with granular jamming. For instance, it should be possible to maintain structural rigidity at no energy cost and switch configurations by actuating only few units where resistance to reconfiguration is weaker. In such a setting, larger connectivities would increase the effect of couplings and could allow for more collective mechanical adaptability. Also, while the Granulobot aggregates discussed herein are effectively two-dimensional, arranging different aggregates next to each other with elements that connect them suggests a straightforward extension to a three-dimensional (3D) version. Finally, the simple contact and actuation principle that has been proposed could be integrated in larger scale programmable matter.

Robotic Prototype

The Granulobot prototype discussed herein is made from 3D printed parts assembled with ball bearings, permanent magnets, a custom battery-powered electronic circuit and a geared DC motor (FIG. 8A). In one embodiment, each individual Granulobot unit includes three co-axial components that can rotate independently from each other: (1) a first wheel, which contains the DC motor (e.g., N20 from Pololu) that drives a rotor with a magnet at its end (referred as an actuated magnet herein); (2) a second rotor, also with a magnet at its end, that can move freely around the central motor axis (referred as free magnet); and (3) a freely rotating second wheel (shown at the top of the exploded view in FIG. 6A) that helps align the Granulobot units when making contact and stabilizes an assembled aggregate against tipping over. Both rotors hold hollow cylindrical neodymium magnets (e.g., N54 from Supermagnetman, size 3×12×15.5 mm3) via a shaft with ball bearings on each end, which let the magnets rotate freely. The active rotor attaches to the motor shaft with two screws to adjust parallelism. The motor's gear train can be changed to different ratios R depending on the application, with values ranging commercially from 5:1 to 1000:1. Additional freely rotating magnets can be added to increase the connectivity of a single unit and build more complex aggregate structures if desired. In alternative embodiments, different types of motors and/or magnets may be used.

FIG. 8 shows Granulobot design, rotor response to load, and actuation. FIG. 8A is an exploded view of Granulobot 3D model in accordance with an illustrative embodiment. FIG. 8B shows assembled electronic circuitry, custom-designed for driving and real-time measurements in accordance with an illustrative embodiment. FIG. 8C is a sketch to indicate sign convention in accordance with an illustrative embodiment. FIG. 8D depicts torque load as a function of rotation speed for different voltages in accordance with an illustrative embodiment. The dotted lines are fits to Eq. 8 with fixed parameters R=9.6$\Omega$, $K_e$=2.65×10-3 V·s·rad$^{-1}$. $K_t$=5.8×10-3 NmA−1 and $\Gamma_f$=0.024 Nm are determined by averaging fit values obtained for each voltage tested. $\beta$=379. FIGS. 8E-8G show $\theta$, voltage bias u, and total voltage U produced by the circuitry as a function of time in a self-oscillating Granulobot with $\Gamma_f$=0. The inertia of a rotor with magnet is $I_0$=0.036 kg×(0.020 m)2, with k=0.229 Nm·V−1, and $\eta_0$=0.231 Nm·s·rad$^{-1}$. FIG. 8E shows overdamped self-oscillation ($\zeta$>1) in which $\alpha$=0, |u|=1 V, and G=0.5 Nm/rad, corresponding to $\zeta$=1.37 and $\omega_0$=5.88 rads$^{-1}$ in accordance with an illustrative embodiment. The curves are Eq. 11 for $\Gamma_f$=0.024 Nm (solid) and $\Gamma_f$=0.034 Nm (dashed). FIG. 8F shows self-oscillation in the crossover regime (0<$\zeta$<1). $\alpha$=−0.5, |u|=1 V, G=1 Nm/rad, corresponding to $\zeta$=0.48 and $\omega_0$=8.31 rads$^{-1}$ in accordance with an illustrative embodiment. The curve is the prediction from Eq. 12, leading to $\omega_0$=7.29 rads$^{-1}$ and amplitude $\theta_n$=0.30 rad. FIG. 8G shows underdamped self-oscillations ($\zeta$=0). $\alpha$=−1, |u|=1 V, and G=1 Nm/rad, corresponding to $\omega_0$=8.31 rads$^{1}$ in accordance with an illustrative embodiment.

In one embodiment, individual Granulobot units have an overall width l=62 mm and a wheel diameter 2r=48 mm (OD). 3D printed parts are made with a UV-curing polyjet printer (Stratasys J850) using an ABS-like resin (RGD511 and 535) and with a Phrozen Mini 4k printer using Loctite Onyx 410 engineering resin. The total weight of a single Granulobot unit with geared motor, printed circuit board (PCB), ball bearings, magnets, and two 220 mAh batteries is 98 g. Alternatively, different dimensions, weights, and/or construction techniques may be used to form the units.

The electronic circuitry includes a Wi-Fi enabled microcontroller (e.g., Espressif ESP-32), an H-bridge to control the motor, a power management circuit with 3.3 V and 6 V regulation from two single-cell lithium-ion polymer (Li-po) batteries, a 6-axis linear and gyroscopic accelerometer, a magnetic sensor with sensitivity in the range of the field produced by the rotor magnets, and a continuous magnetic encoder to measure the motor rotation. In alternative embodiments, the units can include fewer, additional, and/or different components. All electronic components are assembled on a printed circuit board designed to fit within the circular Granulobot body (see FIG. 8B). The motor voltage U is produced by two microcontroller digital outputs using pulse width modulation (PWM), averaged out by the low frequency response of the motor system. The entire circuit is controlled and monitored by a firmware coded in C++ with Arduino and Esp32 libraries. Data can be sent and received by Wi-Fi between individual units as well as with an external computer. For the latter, Python software was developed that gathers data for post-analysis and visualization, at a rate of approximately 200 Hz, and that can execute scripts with a sequence of instructions. This interface also allows to reprogram remotely all robot units simultaneously for firmware changes.

Steady-State Load Response of Individual Granulobot Units

In a DC motor the current I through the winding generates a torque $\Gamma$=$K_t$I, where the constant $K_t$ depends on the mechanical and electromagnetic properties of the motor. The sign convention used is that positive current I produces positive torque drive and positive gearbox output rotor speed $\dot\theta$ in the absence of any load. In FIG. 8C positive torques correspond to clockwise rotation. The torque balance in the steady state of a loaded motor can then be expressed as:

$$\beta K_t I + \Gamma_l - \Gamma_f \mathrm{sgn}(\dot\theta) = 0, \qquad \text{Eq. 6}$$

where $\beta$ is the gear box ratio, $\Gamma_l$ is the external load (which can be positive or negative) on the motor's gearbox output, and $\Gamma_f$>0 is the magnitude of the friction torque that arises from the mechanical parts contacting each other inside the gearbox and the rotor system. The sign function sgn($\dot\theta$)=$\dot\theta$/$\dot\theta$| appears because the friction torque always opposes any rotation. Using Kirchhoff's law, the motor current I during steady rotation obeys:

$$RI = U + E \qquad \text{Eq. 7}$$

where R is the motor resistance, U the voltage applied to the motor, and E the back electromotive force (e.m.f.). The latter opposes the motion of the inner rotor, which spins at speed $\omega = \beta\dot{\theta}$, and can be expressed via Faraday's law as $E = -K_e\omega$), with $K_e$ being the motor's EMF constant. Eq. 7 combined with Eq. 6 can be rewritten as:

$$\beta\frac{K_t}{R}U + \Gamma_1 - \Gamma_f \text{sgn}(\dot{\theta}) = \frac{K_t K_e}{R}\beta^2\dot{\theta}. \qquad \text{Eq. 8}$$

Theoretically $K_t = K_e$, but in practice these two value can be slightly different, and are therefore distinguished below. Furthermore, $K_t$ tends to decrease with an increasing gear ratio; thus, it is important to estimate this value whenever $\beta$ is changed (estimates of $K_e$ and $K_t$ are described below). Defining $\eta_0 = \beta^2 K_t K_e/R$ and $k = \beta K_t/R$ one can arrive at Eq. 1 for the case of steady-state rotation, i.e. when the frictional torque has been exceeded $|\Gamma_1 + kU| > \Gamma_f$.

From Eq. 8 or, equivalently, Eq. 1 it is expected that the speed-torque curves will be linear with slope $\eta_0$ once the load $\Gamma_1$ exceeds the yield threshold torque. When kU becomes larger than $\Gamma_f \text{sgn}(\dot{\theta})$ the yield threshold vanishes, and the units will exhibit rotation already without applied torque, at zero-load rotation speed $$\dot{\theta}_0 = \eta_0^{-1}(kU - \Gamma_f \text{sgn}(\dot{\theta})).$$

FIG. 8D shows that this is consistent with data from experiments where the inventors systematically varied $\Gamma_1$ and measured $\dot{\theta}$ for different voltages U. Only very close to zero bias voltage, where the rotor remains at rest until a certain torque load threshold $$\Gamma_1^*$$

is exceeded, are there deviations. In particular, for the smallest voltages, the angular speed just above $$\Gamma_1^*$$

is underestimated by the model.

The parameters R and $K_e$ can be determined for each motor from measurements of the motor current performed during the experiments presented in FIG. 8D. To determine $K_t$ and $\Gamma_f$ one can fit Eq. 8 with the data in FIG. 8D. It was observed that a single $\Gamma_f$ obtained with such methods allows one to describe well all the behaviors for $\dot{\theta} > 0$. However, when $\dot{\theta}$ approaches zero, there is a threshold that is larger than that estimated by the model. This is consistent with the existence of a static friction torque that is larger than the kinetic one $\Gamma_f$, as commonly observed in dry friction.

Dynamical Load Response of Individual Granulobot Units

To model the self-oscillating solid regime in FIG. 3, one can rewrite Eq. 5 as:

$$(1 + \alpha)\eta_0\dot{\theta} + G\theta = \Gamma_1 + k(|u| - u^*)sgn(\dot{\theta}). \qquad \text{Eq. 9}$$

In this form, Eq. 5 shows how in the self-oscillating regime, where $|u_t| - u^* > 0$, the right hand side (RHS) provides a constant force that always pushes the rotor in the direction it is moving. The RHS thus effectively acts as negative Coulomb friction, which injects energy rather than taking it out. With this energy input, for large $\alpha$, the angle $\theta$ will approach its maximum excursion while experiencing large viscous, velocity-dependent dissipation, i.e. it will exhibit an exponential time dependence similar to charging a capacitor. Near that maximum, where the viscous dissipation will vanish, inherent noise in the system can then trigger a switch of sign in the highly nonlinear sgn function on the RHS of Eq. 9, so that the forcing changes direction and the process reverses, similar to discharging the capacitor. FIG. 8E shows this behavior along with the alternating voltage forcing $|u|sgn(\dot{\theta}_t)$. Since the precise moment of switching the direction of forcing depends on noise, there is chatter in the rise and fall of the forcing, which in turn leads to a small degree of randomness in the successive timing and thus also in the amplitudes of the oscillations (see inset to FIG. 8E).

As a approaches $-1$ from above, damping is no longer dominating and dynamic behavior will be reached. The moment of inertia of the rotor $$I_\theta = mr_0^2$$

has to be taken into account, with m the mass of the rotor including the attached magnet, and $r_0$ its radius of revolution. Adding an inertial term to Eq. 5 or Eq. 9 leads to:

$$\ddot{\theta} + 2\zeta\omega_0\dot{\theta} + \omega_0^2\theta = \bar{\theta}\omega_0^2, \qquad \text{Eq. 10}$$

In Eq. 10, $$\zeta = \frac{(1 + \alpha)\eta_0}{2\sqrt{(GI_\theta)}}$$

is the damping parameter, $$\omega_0 = \sqrt{\frac{G}{I_\theta}}$$

is the oscillation frequency of the undamped oscillator, and $$\bar{\theta} = \frac{\Gamma_1 + k(|u| - u^*)sgn(\dot{\theta})}{I_\theta}$$

is the characteristic angular displacement under the combined action of the load, the Coulomb friction, and the driving torques. This equation describes a harmonic oscillator with (positive) viscous damping but negative Coulomb friction. It has been used to model driven dissipative systems in different contexts and is known to lead to spontaneous limit cycles. For $\zeta>1$, the rotor is in an overdamped regime, resulting in alternating exponential decays (also described by Eq. 9). When the system is turned on, the rotor is initially at rest with $\theta=0$ and $\dot{\theta}=0$. It then starts to oscillate with increasing amplitudes until reaching a steady state. In this regime, Eq. 10 can be solved analytically for a half oscillation, remarking that, as exponential behaviors are expected, one can take as the initial condition $\theta_n(t-t_n=0)=\theta_{n-1}(\infty)$ at each half oscillation n. Until the angular speed flips sign, the solution of Eq. 10 then takes the form:

$$\theta(t) = \bar{\theta}\left(1 - 2e^{\omega_0 t\left(\sqrt{\zeta^2-1}-\zeta\right)}\right).$$  Eq. 11

FIG. 8E shows very good agreement between this solution and the experimental data, with no fit parameters. A slight underestimation of the angle was observed when $\dot{\theta}$ approaches 0, which can be explained by a static friction for vanishing speeds that is larger than $\Gamma_f$ (see FIG. 8D).

In the intermediate regime, $0<\zeta<1$, inertia starts to be important and it is expected that the solution giving the half oscillation will overshoot. As $\zeta$ decreases from 1 the mechanism that triggers the speed sign flip becomes dominated by the dynamics of the system, hence exhibiting more regular oscillations. The initial conditions for a half oscillation n, which corresponds to the first overshoot of the solution at n−1, can be determined to predict that for large n the oscillations approach a steady-state amplitude $\theta_n\rightarrow\bar{\theta}(1+(2e^{\zeta\omega_0\pi/\omega}-1)^{-1})$. Combined with the general form of the solution of Eq. 10 in this regime, this leads for the steady-state to:

$$\theta(t) \simeq \bar{\theta}\left(1 - \frac{e^{\frac{-\zeta\omega_0\pi}{\omega}}}{2\cos\phi}e^{-\zeta\omega_0 t}\cos(\omega t + \phi)\right),$$  Eq. 12

In Eq. 12, $$\omega = \omega_0\sqrt{1-\zeta^2}$$

and $\tan\phi=-\zeta\sqrt{1-\zeta^2}$. FIG. 8F shows good agreement between the analytical prediction and the experimental values for $\zeta=0.47$. The amplitudes are underestimated by the model, but consistent numerically with the observations.

For $\zeta=0$, i.e. $\alpha=-1$ (FIG. 8G), there is no longer viscous damping in the system, while energy is constantly added via negative Coulomb friction. If no other balancing mechanism is present, the amplitude $\theta_n$ is expected to grow linearly over time with frequency $\omega=\omega_0=\sqrt{G/I_\theta}$, independent of the driving force. In a real system, the total voltage produced by the motor controller cannot exceed a maximum value such that $U\leq U_{max}$. As a consequence, a saturation of the total voltage U produced by the circuitry (FIG. 8G) was observed, and finite amplitudes at large n, $\theta_n=f(|u|, U_{max})$ that increase with $|u|$, while $\omega<\omega_0$ decreases with $|u|$ (FIG. 13B).

Tensile Test Experiments

Tensile test experiments were performed with an Instron 5640 materials tester equipped with a 50 kN load cell. In order to apply strain to Granulobot aggregates, two ferromagnetic parallel plates were used as text fixtures. A third, freely rotating magnet, was added to two of the Granulobot units placed on opposite locations within a closed-chain aggregate. To prevent direct contact of these two units' gear surfaces with the Instron plates, slender neodymium magnets were placed between the third rotors and the plates. This firmly attached these two units to the plates while allowing for free rotation of all Granulobot units during testing. All experiments were performed at a constant tensile speed of 1 mm/s.

FIG. 9 depicts Granulobots with three-fold coordination in accordance with an illustrative embodiment. Each unit has one active rotor with a magnet of positive polarity and two passive rotors with magnets of negative polarity. This makes it possible for each unit to couple magnetically to three neighbors (instead of two as for the units described in other embodiments) and enables the formation of Granulobot aggregates with different connectivity. Two of these 3-fold coordinated units were used in a closed chain aggregate to connect it to a materials tester for mechanical load response measurements. In principle, the Granulobot design allows to add an arbitrary number of passive rotors, as long as they can fit within the circumference of the rotor track.

Effect of Parameter Variability on Granulobot Aggregate States

In FIG. 3 the parameters G and $|u|$ determine the different states of a Granulobot aggregate for given load. The values for G, which determines the stiffness of the effective torsion spring in each unit, can be programmed into all Granulobot units. In the fluid-like state G is simply set to zero. In the solid-like states, variability in this parameter will affect the effective stiffness of the aggregate but will not affect how the aggregate switches between passive, viscoplastic and self-oscillating solid-like states. On the other hand, the threshold u* for the voltage bias magnitude $|u|$, which determines the onset of either the active liquid or the active solid, depends on the internal static friction within individual Granulobot units. Variability in this friction, which can come from mechanical components inside the motors and from the frictional motion of all rotors, therefore can have an effect. Going from passive to active flow as $|u|$ is increased, one can anticipate that some units will initiate motion earlier than others and therefore simply broaden the crossover. The one situation where one could expect a significant effect from variability in the dynamical parameters is the transition to the self-organized self-oscillating solid. However, FIG. 6D shows that the onset of a synchronized state can be observed robustly within a wide range of bias voltages, despite residual hardware variability (the slightly differing amplitudes are noted in FIGS. 6B and 6C), and without any prior calibration procedures. Furthermore, there is a key benefit from deliberately introducing much larger variability within the self-oscillating regime, for example by choosing different damping parameters among units. In this case it was found that aggregates are still self-organizing (FIGS. 6E, 6F, and 6G). While losing synchronization, now they exhibit periodic deformations that are global shape changes (FIG. 6H) and that form the basis for different self-coordinated locomotion gaits.

FIG. 10 shows a self-oscillating solid regime from synchronization to wave propagation, where N=10 units, $|u|=2$ V>u*, and G=1.0 Nm/rad. FIG. 10A depicts a power spectrum $S_i(f)$ for each of the units when coupled into a ring aggregate with $\alpha=-0.9$ in accordance with an illustrative embodiment. FIG. 10B depicts a phase shift $\Delta\phi_i=\phi_i-\phi_{i-1}$ between consecutive units when they are all coupled into a ring aggregate with $\alpha=-0.9$ in accordance with an illustrative embodiment. FIG. 10C depicts a power spectrum $S_i(f)$ for each of the units when coupled into a ring aggregate with a spread of $\alpha \in [-0.6,-0.9]$ in accordance with an illustrative embodiment. FIG. 10D depicts phase shift $\Delta\phi_i=\phi_i-\phi_{i-1}$ between consecutive units when they are all coupled into a ring aggregate with a spread of $\alpha \in [-0.6,-0.9]$ in accordance with an illustrative embodiment. FIG. 10E depicts comparison of oscillation amplitude of each unit when coupled in a ring with $\alpha=-0.9$, when coupled in a ring with a spread of $\alpha \in [-0.6,-0.9]$, when isolated with a spread of $\alpha \in [-0.6,-0.9]$ in accordance with an illustrative embodiment.

Morphing Liquid Passing an Obstacle

The onboard monitoring of the rotor angle in each unit makes it possible to develop suitable locomotion strategies by reverse engineering. This proceeds by manually 'teaching' the Granulobot aggregate how to overcome a type of obstacle, recording the potentially complex sequence of local angle changes, and from it extracting the essential features required for successful obstacle management. This can be done using the following three stages:
1. Place the system in the liquid state, with a low typical damping $$\eta_{eff}^0 < 0.01 Ns/\text{rad},$$

which corresponds to $|u|=u_0>1.5$ V, such that it behaves as a passive liquid aggregate. One can then deform the aggregate by hand to pass it over an obstacle. Once a continuous sequence of deformations has been successful in overcoming the obstacle, the inventors reproduced by hand the same sequence without obstacle and record via the Wi-Fi data acquisition platform the associated time-dependent angle changes for each Granulobot unit.
2. Play back these angle variations from a central computer to each Granulobot, which they follow via local feedback using the rotor encoder. The voltage signals generated by the feedback loops are recorded. These voltages are used to infer a general, time dependent voltage bias $u_i(t)$ appropriate to overcome the type of obstacle just trained on. FIG. 7A shows an aggregate of eight Granulobot units in a closed chain, trained to 'flow' over an obstacle. During training by hand it was observed that all eight $u_i(t)$ are oscillating at a similar frequency and amplitude. Furthermore, the signal of a given Granulobot is shifted in phase compared to its neighbor, while Granulobot units placed at opposite positions (i and i+N/2) along the chain seem to have the same phase. This behavior was generalized by using a simple periodic function for the bias voltage that shifts each unit's phase by $4\pi/N$ such that $u_i=(-1)^i u_0+A\sin(wt+\phi_i)$, $$u_i = (-1)^i u_o + A\sin(wt + \phi_i),$$

with $$\phi_{i+1} = \phi_i + \frac{4\pi}{n}$$

and A the amplitude of the oscillation (shown in FIG. 6A).
3. Send to each Granulobot the address of their neighbor such that they can implement locally the bias $u_i$ defined in step 2 above, with $u_o$ and A as user-defined parameters.

When using such a control strategy, only the pair of parameters $(u_0, A)$ must be sent. As the peak voltage A is increased, the aggregate becomes more compliant and follows the contour of the obstacle more closely. This is consistent with a smaller effective viscosity.

Inertial Shape-Shifter

The inertial shape-shifter moves by configuring the Granulobot units into a ring-shaped chain and then applies a suitably chosen shape perturbation that propagates around the ring to drive an overall rolling motion, as shown in FIG. 7H. In a closed chain geometry, the sum of angles must satisfy an overall geometric constraint, namely $$\sum_{i=1}^N \theta_i(t) = \pi(N-2).$$

All angle perturbations $[d\theta_1 \ldots d\theta_i \ldots d\theta_N]$ of units $[1 \ldots i \ldots N]$ must then satisfy $$d\theta_i = \sum_{i \neq j}^N d\theta_j.$$

To achieve this kinematic control in a decentralized way, with the same instructions sent to all the Granulobot units, a local communication strategy was used whereby one unit will temporarily become the leader and the others followers. This control strategy can be implemented as a sequence of four sets of instructions that are sent once to all units simultaneously at the initial stage as follows:
1. Learning the initial topological configuration. The sequence of all units' addresses in the ring-like chain is sent, providing units with information about which of their two direct neighbors is the one connected to their active rotor.
2. Kinematic constraints and initial position of the perturbation. An initial leader address and a number of trailing followers are chosen. This leader and its followers then implement a perturbation as follows. The leader sends in real-time to its actuated neighbor the value of its angle $\theta_i$. This value is propagated through all the followers by neighbor-neighbor communication until the last follower is reached. Every follower applies a rotation that is a linear combination of the leader readout $d\theta_{i+1}=\alpha_{i+1}d\theta_i$, such that the full sequence of coefficient $\{\alpha_1, \ldots, \alpha_N\}$ satisfies the angle conservation relationship $$d\theta_i = \sum_{i \neq j}^{N-1} d\theta_j.$$

3. Leader unit perturbation. The angle of the leader unit is perturbed according to $d\theta_i(t)=d\theta_0 \sin(\pi/T)$, where the parameters T and $d\theta_0$ are chosen to control the shape of the perturbation.
4. Perturbation propagation. When the leader begins the shape perturbation, a timer starts. When this timer reaches $t_{com}$, the leader stops moving and sends a message to its first follower to turn it into the new leader. This triggers a repeat of the perturbation procedure, which then propagates through the chain.

The result of this propagating shape perturbation is a shift in the center of gravity of the aggregate that triggers a rolling or crawling motion sustained by the aggregate's inertia.

Motor Operation and Parameters

Systematic experiments were performed on isolated N20 motors to describe their behaviors and measure the system constants R, $K_e$, $K_t$ and $\Gamma_f$, as well as to determine the adequate pulse width modulation (PWM) frequency $f_{PWM}$. One can use the Granulobot's battery-powered motor driver circuit to ensure the same experimental conditions as when the robot is functioning. The inventors used an external current sensor that can be plugged into its electronic circuitry, and the same encoder as in the Granulobot.

Pulse Width Modulation Motor Drive (PWM)

To simplify electronics and minimize heat in the motor, control is achieved digitally with pulse width modulation (PWM). PWM switches the motor on and off at a certain frequency. By adjusting the duty cycle (i.e., the fraction of time in each switching cycle where the motor driver is delivering a fixed maximum voltage $U_{max}$), one can adjust the time-averaged voltage seen by the motor, $U_{PWM}$. The frequency must be chosen sufficiently high such that individual on and off switching events are not felt by the motor, which behaves as a low-pass filter. During the off portion of the cycle, instead of completely turning off the motor (fast decay mode), such motor response can be implemented by short-circuiting the motor, such that it behaves transiently as a generator. This is the slow decay mode and can be implemented with the particular motor driver circuit used in the Granulobot.

FIG. 11 depicts motor driving methods with $\beta=379$. FIG. 11A shows angular speed $\dot{\theta}$ as a function of applied PWM voltage $U_{PWM}$ for slow and fast decay mode, with $\Gamma_f=0.05$ Nm, and PWM frequency $f_{PWM}=25$ Hz in accordance with an illustrative embodiment. FIG. 11B shows angular speed $\dot{\theta}$ as a function of applied PWM voltage $U_{PWM}$ for different PWM frequencies $f_{PWM}$ with $\Gamma_f=0.08$ Nm in accordance with an illustrative embodiment. FIG. 11C shows angular speed $\dot{\theta}$ as a function of applied PWM voltage $U_{PWM}$ with $f_{PWM}=25$ Hz (circles), and with a continuous voltage source (dots) for $\Gamma_f=-0.04$, 0 and 0.04 Nm in accordance with an illustrative embodiment.

FIG. 11A shows a comparison between the fast (not shorted) and the slow (shorted) decay mode. It can be seen that only the latter produces a linear dependence of rotation speed versus time-averaged voltage $U_{PWM}$. The slow decay mode was therefore used throughout. FIG. 11B shows curves of the rotation speed as a function of $U_{PWM}$ for different PWM frequencies. Choosing a high frequency leads to the appearance of sharp, torque-load dependent voltage thresholds for motion. Such nonlinear threshold behaviors should be considered when developing control applications. In the current Granulobot prototypes, a frequency was chosen low enough that it minimizes the threshold, and behaves as closely as possible as a continuous voltage control, but still sufficiently high that it can be filtered out by the motor's low-pass response. From FIG. 11B, $f_{PWM}=25$ Hz. FIG. 11C compares the measured rotor angular speed with PWM control at $f_{PWM}=25$ Hz and continuous voltage control. It was observed that PWM control reproduces well the behavior of a continuous voltage drive. In this embodiment, PWM with frequency $f_{PWM}=25$ Hz was used in slow decay mode, and a N20 MP motor was used with gear ratio $\beta=379$ from Pololu.

Resistance R and e.m.f Constant $K_e$

From Kirchhoff's law, R and $K_e$ must obey:

$$1 = \frac{U}{R} - \frac{K_e \beta}{R} \dot{\theta}$$

Eq. 13

The inventors also performed systematic experiments controlling the voltage U and the torque load $\Gamma_l$ while measuring current I and angular speed $\dot{\theta}$. FIG. 12 shows current curves with $\beta=379$ and $f_{PWM}=25$ Hz. Specifically, FIG. 12A shows measured current I as function of measured angular velocity for a range of applied PWM voltage $U_{PWM} \in [0, 6]$ and a range of $\Gamma_f \in [-0.08, 0.08]$ Nm (circles and squares correspond to negative and positive loads, respectively) in accordance with an illustrative embodiment. FIG. 12B shows measured current I as a function of applied PWM voltage $U_{PWM}$ when the rotor is stalled in accordance with an illustrative embodiment.

As noted, FIG. 12A shows measurement of current I as a function of angular speed. From these curves, a linear fit gives one directly 1/R and the slope $K_e \beta$, from which one can determine R and $K_e$ by taking the average of all fit parameters. Finally, the values $R=9.61\Omega$ and $K_e=0.0027$ V·s·rad$^{-1}$ were used. Dotted lines in FIG. 12A represent Eq. 13 with these parameters for different voltage and for both positive and negative torque loads.

The motor resistance R can also be determined by measuring current when the motor is stalled ($\omega=0$). A linear regression results in $\beta=U/I$. FIG. 12B shows the stall curve for the same motor as in FIG. 12A. The value $\beta=10.6\Omega$ was obtained, which is consistent with the value obtained with the previous method. In one embodiment, the value $\beta=9.6\Omega$ can be used due to the fact that stalling creates overheating, and the overheating can increase the resistance value relative to the value at a normal usage temperature.

Torque constant $K_t$ and static friction threshold $\Gamma_f$ are discussed below. The torque constant $K_t$ is defined by:

$$\beta K_t I = \Gamma_f \text{sgn}(\dot{\theta}) - \Gamma_1$$

Eq. 14

The obtained current-torque curve was noisy, giving wide error bars. For this reason the variables $K_t$ and $\Gamma_f$ were determined by fitting Eq. 13 in the torque-speed curves instead (FIG. 8D) with R and $K_e$ values determined from the current-speed curves (FIG. 12A) as constrained parameters.

Self-oscillation of a Granulobot unit for $0 < \zeta < 1$ is described below. When $0 < \zeta < 1$, the general solution of Eq. 10 for a half oscillation, before the speed sign flips, takes the form:

$$\theta(t) = \bar{\theta}\left(1 - C\frac{e^{-\zeta\omega_0 t}}{\cos\phi}\cos(\omega t + \phi)\right).$$

Eq. 15

Here $$\omega = \omega_0 \sqrt{1-\zeta^2},$$

$\tan \phi = -\zeta/\sqrt{1-\zeta^2}$, and $C=1-\theta_0/\bar{\theta}$, with $\theta_0$ the rotor's initial angle. As the behavior of Eq. 15 is no longer monotonic in this intermediate regime $0 < \zeta < 1$, the simple form of the initial conditions $\theta_n(t-t_n=0)=\theta_{n-1}(\infty)$ for each of the half cycles n is no longer applicable. Therefore, it becomes more complicated to find the value of C for subsequent oscillation cycles. A procedure to resolve this is outlined below.

Initially, Eq. 10 was decomposed into two equations of opposite right hand sign depending on $\dot{\theta}$. Assuming the oscillator is at rest at t=0 so that $\theta(t=0)=0\,\theta_0=0$, one then has from Eq. 15, above, that the solution of Eq. 10 in the main text for $\dot{\theta}>0(\theta>0)$ is:

$$\theta(t) = \bar{\theta}\left(1 - \frac{e^{-\zeta\omega_0 t}}{\cos\phi}\cos(\omega t + \phi)\right). \qquad \text{Eq. 16}$$

This solution should be valid until reaching the first turning point of the angle trajectory at $t=t_1$, when $\dot{\theta}(t1)=0$. Such a condition is reached for $t_1=\pi/\omega$, which corresponds to an amplitude $\theta_1=\theta(t1)=\bar{\theta}(1+e^{-\zeta\omega_0\pi/\omega})$. The second turning point is determined by solving Eq. 10 with a right hand term of opposite sign ($\theta<0$), and by considering the initial conditions $\dot{\theta}(t1)=0$ and $\theta(t_1)=\theta_1$, leading to:

$$\theta(t) = -\bar{\theta}\left(1 + \left(2e^{\zeta\omega_0\pi/\omega} + 1\right)\frac{e^{-\zeta\omega_0 t}}{\cos\phi}\cos(\omega t + \phi)\right). \qquad \text{Eq. 17}$$

Similarly, by considering $\dot{\theta}(t_2)=0$, one can determine the amplitude of the second turning point. Doing this for successive maxima leads to a recursive expression of the amplitude $\theta_n$, which in the limit of large n can be expressed as:

$$\theta_n \to \bar{\theta}\left(1 + \left(2e^{\zeta\omega_0\pi/\omega} - 1\right)^{-1}\right). \qquad \text{Eq. 18}$$

For large n, the expression $\theta(t-t_n=0)=\theta_n=\bar{\theta}(1-C)$ would thus be expected so that $C=1-\theta_n/\theta$. Replacing C in Eq. 15 leads to:

$$\theta(t) \simeq \bar{\theta}\left(1 - \frac{e^{\frac{-\zeta\omega_0\pi}{\omega}}}{2\cos\phi}e^{-\zeta\omega_0 t}\cos(\omega t + \phi)\right). \qquad \text{Eq. 19}$$

It is noted that Eq. 19 is the same as Eq. 12. FIG. 13 includes supplementary data for isolated individual units in a self-oscillating regime. FIG. 13A shows $\theta$, voltage bias u, and total voltage U produced by the circuitry measured simultaneously as a function of time for $|u|=2$ V>u*, G=0.1 Nm/rad, and $\alpha=0$ in accordance with an illustrative embodiment. The shorter curves in FIG. 13A represent Eq. 11. In this embodiment, inertia of the rotor with magnet was $I_\theta=0.036$ kg×$(0.020$ m$)^2$, $\Gamma_f=0.024$ Nm, k=0.229 Nm·$V^{-1}$, and $\eta_0=0.231$ Nm·s·$rad^{-1}$. In alternative embodiments, different values can be used. FIG. 13B shows oscillation frequency $\omega$ (circles) and steady-state amplitude of the oscillations (squares) as a function of the bias $|u|$ for $\alpha=0$ and $\Gamma_f=0$ in accordance with an illustrative embodiment. As shown (black dotted line), an oscillation frequency $\omega_0$ would be expected if no saturating mechanism were at play and if the amplitude could grow indefinitely.

In an illustrative embodiment, any of the operations described herein can be performed by a computing system that includes a processor, a memory, a user interface, a transceiver, etc. The memory can be used to store computer-readable instructions that, upon execution by the processor, cause the computing system to perform the operations described herein. All or a portion of the computing system can be incorporated into a robot unit. For example, the computing system can be incorporated onto the printed circuit board of an individual robotic unit. All or a portion of the computing system can also be in the form of $\alpha$ system that is remote from the robotic units and used to monitor and/or control them. As an example, FIG. 14 is a block diagram of a computing system 1400 to implement a robotic assembly in accordance with an illustrative embodiment. The computing system 1400 can communicate directly with other computing devices (e.g., servers, processors, etc.), or through a network 1435, depending on the implementation.

The computing system 1400 includes a processor 1405, an operating system 1410, a memory 1415, an input/output (I/O) system 1420, a network interface 1425, and a robotic application 1430. In alternative embodiments, the computing system 1400 may include fewer, additional, and/or different components. The components of the computing system 1400 communicate with one another via one or more buses or any other interconnect system. In embodiments in which the computing system is remote from the robotic units, the computing system 1400 can be any type of computing device (e.g., tablet, laptop, desktop, smartphone, etc.) that has sufficient processing power to perform the operations described herein.

The processor 1405 can be in electrical communication with and used to control any of the system components described herein. For example, the processor can be used to execute the robotic application 1430, process received user selections, send data and commands to the robotic units, receive raw data from a robotic unit, process the data using the algorithms described herein, etc. The processor 1405 can be any type of computer processor known in the art and can include a plurality of processors and/or a plurality of processing cores. The processor 1405 can include a controller, a microcontroller, an audio processor, a graphics processing unit, a hardware accelerator, a digital signal processor, etc. Additionally, the processor 1405 may be implemented as a complex instruction set computer processor, a reduced instruction set computer processor, an x86 instruction set computer processor, etc. The processor 1405 is used to run the operating system 1410, which can be any type of operating system.

The operating system 1410 is stored in the memory 1415, which is also used to store programs, robot unit data, readings and settings, network and communications data, peripheral component data, the robotic application 1430, and other operating instructions. The memory 1415 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 1415 can be in the cloud to provide cloud storage for the system. Similarly, in one embodiment, any of the computing components described herein (e.g., the processor 1405, etc.) can be implemented in the cloud such that the system can be run and controlled through cloud computing.

The I/O system 1420 is the framework which enables users and peripheral devices to interact with the computing system 1400. The I/O system 1420 can include a display, one or more speakers, one or more microphones, a keyboard, a mouse, one or more buttons or other controls, etc. that allow the user to interact with and control the computing system 1400. The I/O system 1420 also includes circuitry and a bus structure to interface with peripheral computing devices such as power sources, universal service bus (USB) devices, data acquisition cards, peripheral component interconnect express (PCIe) devices, serial advanced technology attachment (SATA) devices, high-definition multimedia interface (HDMI) devices, proprietary connection devices, etc.

The network interface 1425 includes transceiver circuitry (e.g., a transmitter and a receiver) that allows the computing device 1400 to transmit and receive data to/from other devices such as a remote data processing center, individual robotic units, an assembly of robotic units, servers, websites, etc. The network interface 1425 enables communication through the network 1435, which can be one or more communication networks. The network 1435 can include a cable network, a fiber network, a cellular network, a wi-fi network, a landline telephone network, a microwave network, a satellite network, etc. The network interface 1425 also includes circuitry to allow device-to-device communication such as Bluetooth® communication.

The robotic application 1430 can include software and algorithms in the form of computer-readable instructions which, upon execution by the processor 1405, performs any of the various operations described herein such as controlling robotic units, sending/receiving robotic unit neighbor data, determining and assigning voltage polarities, determining the amount of angular rotation to facilitate desired movement, determining an amount of rotation and by which individual unit(s) to result in a desired separation of units, determining and assigning compliance states, etc. The robotic application 1430 can utilize the processor 1405 and/or the memory 1415 as discussed above. In an alternative implementation, the robotic application 1430 can be remote or independent from the computing system 1400, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A robotic system comprising:
  a first robotic unit, wherein the first robotic unit includes:
    a wheel;
    an actuator that is mounted to the wheel, wherein the actuator is configured to rotate an active rotor that is mounted within the wheel;
    an actuated magnet that is mounted to the active rotor such that the actuator controls rotation of the actuated magnet within the wheel; and
    a free magnet mounted to a passive rotor that rotates within the wheel;
  wherein movement of the actuated magnet by the actuator causes rotation of the wheel, and wherein the free magnet is configured to attach to a second actuated magnet of a second robotic unit to facilitate movement of the first robotic unit.

2. The system of claim 1, wherein the first robotic unit also includes a sensor, and wherein the sensor measures an amount of rotation of the actuator.

3. The system of claim 1, wherein the first robotic unit also includes a computing system that includes a transceiver, wherein the transceiver receives information regarding the second robotic unit and a third robotic unit.

4. The system of claim 3, wherein the information received by the transceiver comprises an indication that the third robotic unit is attached to the actuated magnet of the first robotic unit.

5. The system of claim 4, wherein the transceiver transmits a motor angle value to the third robotic unit for propagation to a fourth robotic unit such that all robotic units in an assembly receive the motor angle value.

6. The system of claim 1, wherein the first robotic unit also includes a computing system that includes a transceiver, wherein the transceiver receives a motor angle value of the second robotic unit.

7. The system of claim 6, wherein the computing system includes a processor, and wherein the processor is configured to determine an amount of rotation of the motor to achieve a desired movement, wherein the amount of rotation of the motor is determined based on the motor angle value received from the second robotic unit.

8. The system of claim 1, wherein the first robotic unit also includes a computing system that includes a processor, wherein the first robotic unit is temporarily a leader unit, and wherein the processor uses a timer to control a duration during which the motor of the leader unit rotates.

9. The system of claim 8, wherein, upon expiration of the timer, the processor sends a message to the second robotic unit that indicates the second robotic unit is temporarily the leader unit for a subsequent movement.

10. The system of claim 1, wherein the actuator comprises a motor, and wherein a polarity of voltage applied to the motor controls a direction of rotation of the motor.

11. The system of claim 10, wherein adjacent robotic units are assigned opposite voltage polarities such that the adjacent robotic units rotate in opposite directions.

12. The system of claim 1, wherein the first robotic unit is part of a sequence of robotic units that also includes the second robotic unit, and wherein each robotic unit in the sequence is provided with its relative position in the sequence.

13. The system of claim 1, wherein the first robotic unit is assigned a compliance state, wherein the compliance state indicates whether an assembly that includes the first robotic unit is rigid or soft, wherein the first robotic unit is one of a plurality of robotic units that perform continuous deformation in a multi-units aggregate in accordance with the assigned compliance state.

14. A method of forming a robotic unit, the method comprising:
  forming a wheel;
  mounting an actuator to the wheel;
  mounting an active rotor to the actuator, wherein the actuator is configured to rotate the active rotor;
  mounting an actuated magnet to the active rotor such that the actuator controls rotation of the actuated magnet within the wheel to cause rotation of the wheel; and
  mounting a free magnet to a passive rotor that rotates within the wheel, wherein the free magnet is configured to attach to a second actuated magnet of a second robotic unit to facilitate movement of the first robotic unit.

15. The method of claim 14, further comprising mounting a sensor to the actuator, wherein the sensor measures an amount of rotation of the motor.

16. The method of claim 14, further comprising mounting a printed circuit board that houses a computing system within the wheel, wherein the computing system includes a processor configured to control a polarity of a voltage applied to the actuator, wherein the polarity of the voltage controls a direction of rotation of the actuator.

17. The method of claim 16, wherein the computing system also includes a transceiver configured to receive an instruction regarding which polarity of the voltage to apply to the motor, and wherein adjacent robotic units use voltages of opposite polarity such that the adjacent robotic units rotate in opposite directions.

18. The method of claim 16, further comprising mounting a printed circuit board that houses a computing system within the wheel, wherein the computing system includes a processor configured to receive an indication that the robotic unit is a leader unit.

19. The method of claim 18, wherein the processor uses a timer to control a duration during which the motor of the leader unit rotates.

20. The system of claim 19, wherein, upon expiration of the timer, the processor sends a message to the second robotic unit that indicates the second robotic unit is the leader unit for a subsequent movement.

\*   \*   \*   \*   \*